(12) United States Patent
Urban

(10) Patent No.: US 11,312,807 B2
(45) Date of Patent: Apr. 26, 2022

(54) KEY-AND-LOCK COMMODITY SELF-HEALING COPOLYMERS

(71) Applicant: Clemson University Research Foundation, Clemson, SC (US)

(72) Inventor: Marek W. Urban, Clemson, SC (US)

(73) Assignee: Clemson University Research Foundation, Clemson, SC (US)

( * ) Notice: Subject to any disclaimer, the term of this patent is extended or adjusted under 35 U.S.C. 154(b) by 181 days.

(21) Appl. No.: 16/512,937

(22) Filed: Jul. 16, 2019

(65) Prior Publication Data

US 2020/0095361 A1 Mar. 26, 2020

Related U.S. Application Data

(60) Provisional application No. 62/702,410, filed on Jul. 24, 2018.

(51) Int. Cl.
*C08F 293/00* (2006.01)

(52) U.S. Cl.
CPC ...... *C08F 293/005* (2013.01); *C08F 2438/01* (2013.01)

(58) Field of Classification Search
CPC .................. C08F 293/005; C08F 2438/01
USPC ...................................... 526/329.5
See application file for complete search history.

(56) References Cited

PUBLICATIONS

Fernandez-Garcia et al., "Glass Transition Temperatures of Butyl Acrylate-Methyl Methacrylate Copolymers", Journal of Polymer Science Part B, Polymer Physics 37: pp. 2512-2520, Sep. 1999).*
S. R. White et al., Autonomic healing of polymer composites. Nature 409, 794-797 (2001).
X. Chen et al., A Thermally Re-mendable Cross-Linked Polymeric Material. Science 295, 1698-1702 (2002).
B. Ghosh, M. W. Urban, Self-repairing oxetane-substituted chitosan polyurethane networks. Science 323, 1458-1460 (2009).
K. Imato et al., Self-Healing of Chemical Gels Cross-Linked by Diarylbibenzofuranone-Based Trigger-Free Dynamic Covalent Bonds at Room Temperature. Angewandte Chemie Internal.
H. Ying, Y. Zhang, J. Cheng, Dynamic urea bond for the design of reversible and self-healing polymers. Nat Commun 5, (2014).
R. P. Sijbesma et al., Reversible polymers formed from self-complementary monomers using quadruple hydrogen bonding. Science 278, 1601-1604 (1997).
P. Cordier, F. Tournilhac, C. Soulié-Ziakovic, L. Leibler, Self-healing and thermoreversible rubber from supramolecular assembly. Nature 451, 977-980 (2008).
M. Burnworth et al., Optically healable supramolecular polymers. Nature 472, 334-337 (2011).
N. Holten-Andersen et al., pH-induced metal-ligand cross-links inspired by mussel yield self-healing polymer networks with near-covalent elastic moduli. Proceedings of the Nat.
M. Nakahata, Y. Takashima, H. Yamaguchi, A. Harada, Redox-responsive self-healing materials formed from host-guest polymers. Nature communications 2, 511 (2011).
Y. Chen, A. M. Kushner, G. A. Williams, Z. Guan, Multiphase design of autonomic self-healing thermoplastic elastomers. Nature chemistry 4, 467-472 (2012).
J. A. Neal, D. Mozhdehi, Z. Guan, Enhancing Mechanical Performance of a Covalent Self-Healing Material by Sacrificial Noncovalent Bonds. Journal of the American Chemical Soc.
C.-H. Li et al., A highly stretchable autonomous self-healing elastomer. Nat Chem 8, 618-624 (2016).
Y. Yang, M. W. Urban, Self-Repairable Polyurethane Networks by Atmospheric Carbon Dioxide and Water. Angewandte Chemie International Edition 53, 12142-12147 (2014).
C. C. Corten, M. W. Urban, Repairing polymers using oscillating magnetic field. Advanced Materials 21, 5011-5015 (2009).
L. Huang et al., Multichannel and Repeatable Self-Healing of Mechanical Enhanced Graphene-Thermoplastic Polyurethane Composites. Advanced Materials 25, 2224-2228 (2013).
H. M. Jonkers, A. Thijssen, G. Muyzer, O. Copuroglu, E. Schlangen, Application of bacteria as self-healing agent for the development of sustainable concrete. Ecological engine.
F. S. Bates et al., Multiblock polymers: panacea or Pandora's box? Science 336, 434-440 (2012).
Y. Yang, M. W. Urban, Self-healing polymeric materials. Chemical Society Reviews 42, 7446-7467 (2013).
C. C. Hornat, Y. Yang, M. W. Urban, Quantitative Predictions of Shape-Memory Effects in Polymers. Advanced Materials 29, (2017).
B. Sandmann et al., The Self-Healing Potential of Triazole-Pyridine-Based Metallopolymers. Macromolecular rapid communications 36, 604-609 (2015).
H. N. Cheng, T. Asakura, A. D. English, NMR spectroscopy of polymers: innovative strategies for complex macromolecules. (ACS Publications, 2011).

* cited by examiner

*Primary Examiner* — Edward J Cain
(74) *Attorney, Agent, or Firm* — Joseph T. Guy; Patent Filing Specialist Inc.

(57) ABSTRACT

Provided is a copolymer exhibiting self-healing properties. The copolymer comprises first units comprising first pendant groups wherein the first pendant groups are alkyls having at least 1 to no more than 6 carbons. Second units comprising second pendant groups are alkyls having at least 2 to no more than 8 carbons. The first units and second units are in a molar ratio of 45/55 to 55/45 and the pendant groups form an inter-pendant space having a volume of at least 80 Ang.$^3$ to no more than 140 Ang.$^3$. The copolymer comprises no more than 3 adjacent first units and no more than 3 adjacent second units.

12 Claims, 16 Drawing Sheets
(13 of 16 Drawing Sheet(s) Filed in Color)

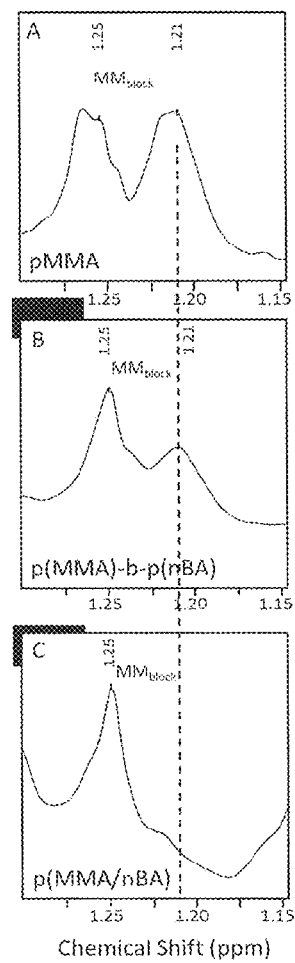

KEY-AND-LOCK COMMODITY SELF-HEALING COPOLYMERS

CROSS-REFERENCE TO RELATED APPLICATIONS

This invention claims priority to pending U.S. Provisional Application No. 62/702,410 Jul. 24, 2018 which is incorporated herein by reference.

STATEMENT OF FEDERALLY SPONSORED RESEARCH OR DEVELOPMENT

This invention was made with government support under DMR 1744306 awarded by National Science Foundation. The government has certain rights in the invention.

BACKGROUND

The present invention is related to improved copolymers which have self-healing properties. More specifically, the present invention is related to improved self-healing commodity copolymers.

Biological systems have a built-in mechanism of self-healing that not only prolongs their lifetime, but enhances quality of living while retaining biological functions. These complex processes involve multi-level transient chemico-physical events. The goal of mimicking this behavior is to achieve efficient healing in synthetic materials, and in particular, solid state polymers. Although the concept of solid-state, self-healing polymers has been tackled for almost two decades, it still represents a monumental scientific challenge. In the last two decades' advances in the development of materials capable of self-healing involved: (1) embedding reactive encapsulated fluids which burst open upon damage to fill and repair damaged areas; (2) chemical incorporation of dynamic bonds into existing materials' structures that upon cleavage reform; (3) physically dispersing superparamagnetic or other nanomaterials which remotely respond to magnetic or electromagnetic fields, thus enabling repairs and (4) embedding living organisms capable of remending damaged structures. These and numerous other studies have demonstrated that to make technological advances of healable polymers it is necessary to alter and incorporate often complex chemical and/or physical changes, thus limiting their practicality with marginal societal impacts. However, existing polymers, and copolymers in particular, if designed properly, are capable of encoding molecular features by placements of repeating units that interact with each other.

While recent review articles and monographs articulated that the events responsible for self-repairing require synchronized chemical and physical events, the role of van der Waals (vdW) interactions has not been realized. These ubiquitous interactions exist in many materials, but there are limited experimental methods to measure them. Provided herein is a copolymer which meets the long standing needs in the art. The copolymer exhibits self-healing properties using commodity, or readily available and inexpensive, monomers.

SUMMARY OF THE INVENTION

The invention is related to a self-healing copolymer.

More specifically, the present invention is related to a copolymer comprising first units and second units which are preferably alternating, wherein the pendant groups of adjacent units form an interpendant space suitable for receiving pendant groups from adjacent polymeric chains wherein the pendant groups from adjacent polymeric chains are secured in the interpendant space by vdW forces.

These and other embodiments, as will be realized, are provided in a copolymer exhibiting self-healing properties. The copolymer comprises first units comprising first pendant groups wherein the first pendant groups are alkyls having at least 1 to no more than 6 carbons. Second units comprise second pendant groups wherein the second pendant groups are alkyls having at least 2 to no more than 8 carbons. The first units and second units are in a molar ratio of 45/55 to 55/45 and the pendant groups form an inter-pendant space having a volume of at least 80 Ang.$^3$ to no more than 140 Ang.$^3$. The copolymer preferably comprises no more than 3 adjacent first units and no more than 3 adjacent second units.

BRIEF DESCRIPTION OF FIGURES

The patent or application file contains at least one drawing executed in color. Copies of this patent or patent application publication with color drawing(s) will be provided by the Office upon request and payment of the necessary fee.

FIG. 12B graphically illustrates $^1$H NMR spectra of p(MMMA) (A), p(MMA)-b-p(nBA) (B), and p(MMA/nBA)

DESCRIPTION

The present invention is related to self-healing copolymers which are prepared from commodity, or readily available and relatively inexpensive, monomers. More specifically, the present invention is related to a copolymer which exhibits self-healing properties through optimization of vdW interactions.

Provided herein are copolymers with extraordinary self-healing properties in commodity poly(methyl methacrylate/n-butyl acrylate) (pMMA/nBA) copolymers and their methacrylate-based selective copolymer derivatives. Without chemical and physical modifications, self-healing can be achieved without external intervention for copolymers that exhibit interdigitated 'key-and-lock' chain configurations enabled by propitious vdW interchain interactions.

Figure 1:
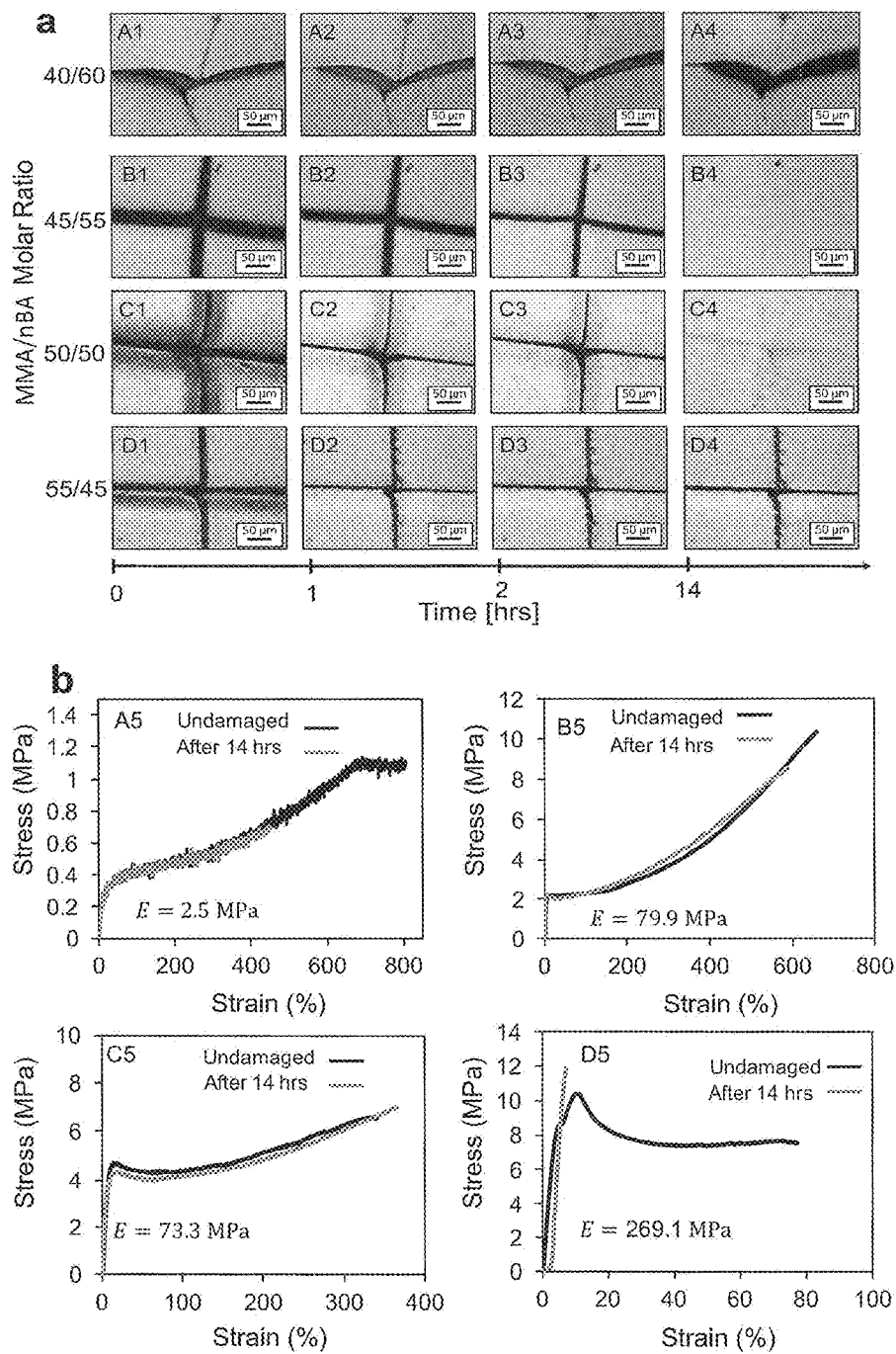
FIG. 1 provides optical images of damaged p(MMA/nBA) copolymers with the following MMA/nBA molar ratios: 40/60 (A1-A4), 45/55 (B1-B4), 50/50 (C1-C4), and 55/45 (D1-D4) which were allowed to repair under ambient conditions and graphically illustrates the corresponding stress-strain curves before damage and 14 hrs after repair for each copolymer composition.
Figure 5:
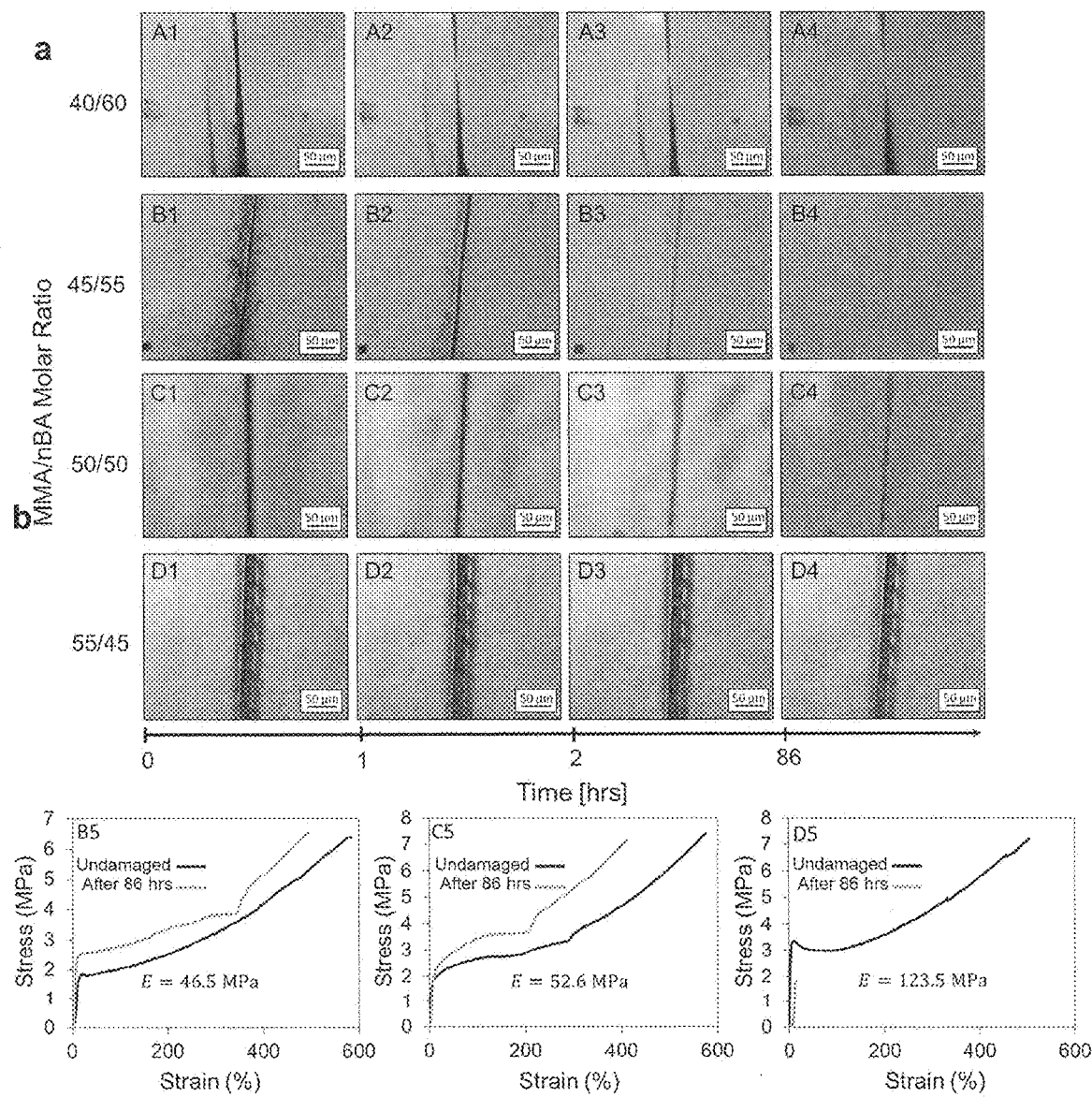
FIG. 5 provides in part a optical images of damaged high mol. wt. colloidal p(MMA/nBA) copolymers with the following MMA/nBA molar ratios: 40/60 (A1), 45/55 (B1), 50/50 (C1), and 55/45 (D1) and in part b the corresponding stress-strain curves (repeated in triplicate) before damage and 86 hrs after for 45/55 (B5), 50/50 (C5), and 55/45 (D5) MMA/nBA compositions.

To macroscopically demonstrate this behavior, a series of copolymers were synthesized using atom transfer radical polymerization (ATRP), statistical free radical, and colloidal polymerization. The MMA/nBA molar ratios were varied from 30/70 to 70/30, while maintaining similar molecular weight for all compositions with the particle sizes being ~25 kD for those particles prepared by ATPR; about ~60 kD for particles prepared by statistical free radical methods and ~700 kD for particles prepared by colloidal methods. FIG. 1-a illustrates selected optical images of p(MMA/nBA) copolymer films produced by ATRP in the 40:60 to 55:45 compositional range that were damaged (0 hrs) and allowed to self-heal (~14 hrs). As seen in FIG. 1a, self-repair occurs without external intervention only within narrow 45/55-50/50 MMA/nBA compositional ranges. However, outside this range, self-repair does not take place even days after damage. Even though the glass transition temperature (T$_g$) for nBA-richer 40/60 copolymers is below ambient conditions (R.T., RH=50%), mechanical damage is not recovered, and a wound does not self-heal. The corresponding stress-strain curves recorded before damage and after self-repair for representative compositions are shown in FIG. 1b. For undamaged copolymer films, when MMA/nBA molar ratios increase, Young's moduli (E) also increases. However, ~14 hrs after damage, only 45/55 to 50/50 p(MMA/nBA) copolymer compositions recover 90-100% (+/−5%) of their original tensile strains, respectively (FIG. 1b, B5 and C5). The 45/55 self-healing copolymer exhibits decent toughness with the tensile strain of ~550% and the stress values of ~8.6 MPa after self-healing. In contrast, the copolymer films outside this range exhibit ~55 and 10% recovery as illustrated in FIG. 1b particularly examples A5 and D5, respectively. Parallel behavior, although longer self-healing times, are observed for copolymers produced by colloidal radical polymerization as illustrated in FIGS. 5, a-b and Table 3. As shown in optical images in FIG. 1a, and indicated in other studies, copolymers with the $T_g$ below the operating temperature do not necessarily self-heal because long range macromolecular segmental motion responsible for the $T_g$ transitions may not be sufficient to induce self-healing.

Without being limited by theory and in view of these observations, it is reasonable to hypothesize that for copolymers with 45/55 to 55/45 MMA/nBA molar ratios, the neighboring MMA and nBA copolymer units and their distribution may play some role in self-healing as these compositions are expected to form random and/or alternating chain topologies. To test this hypothesis, MMA and nBA monomers were copolymerized to obtain number average molecular weight with $M_n=\sim 20$-30 kDa pMMA-b-pnBA block copolymers with controlled block sizes wherein the number of blocks ranging from 2 to 6 as reported in Table 5. Regardless of the block size, these block copolymers do not exhibit self-healing under the same conditions.

The invention is illustrated using, primarily, alkyl methacrylate with an alkyl group of 1-6 carbons, preferably 1 carbon, being exemplary as a first unit of the copolymer. The invention is illustrated using, primarily, alkyl acrylate as the second unit with an alkyl of 2 to 8 carbons, preferably 4 carbons, being preferred.

While not limited to any theory, it is hypothesized that the pendant alkyl groups of adjacent units of the copolymer form an interpendant space with a volume of about 80-140 Ang.$^3$, preferably about 110-130 Ang.$^3$ and most preferably about 120 Ang.$^3$. The pendant groups of adjacent copolymer chains are received into the interpendant space through vdW forces as discussed elsewhere herein. It is therefore preferable that the adjacent units are alternating first units and second units as this provides the optimum formation of interpendant space. If the interpendant space is to small the vdW forces are insufficient to achieve self-healing. If the interpendant space is to large, as would happen with longer alkyl groups on the units, alkyl groups of adjacent units can decrease, or eliminate access to the interpendant space due to stearic interference thereby inhibiting the ability of pendant groups from adjacent chains to inter the interpendant space thereby mitigating the ability of the copolymer to self-heal.

Figure 6:
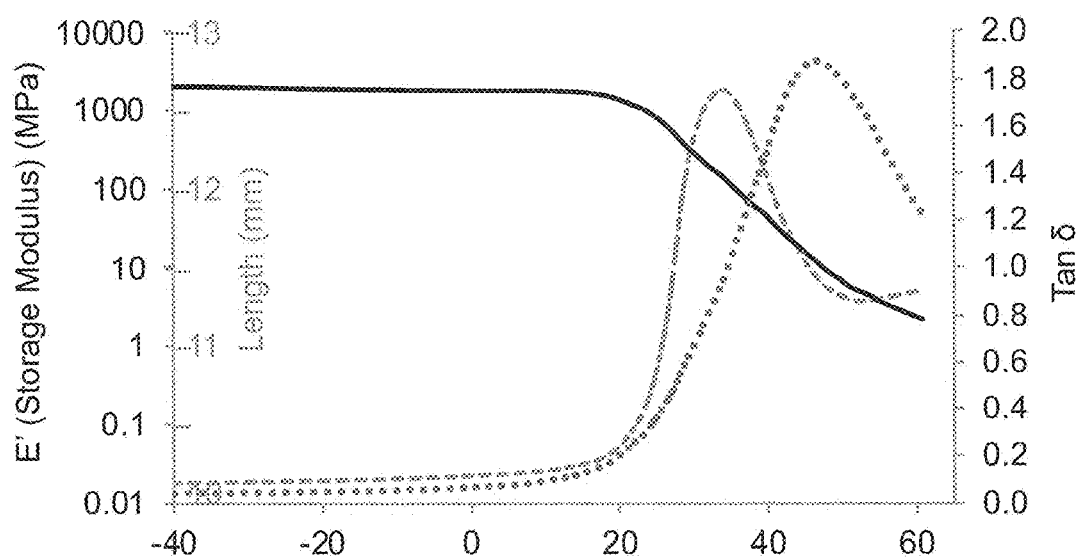
FIG. 6 graphically illustrates the storage modulus (E′— solid line), tan δ (dotted line), and viscoelastic length transition (VLT—dashed line) of 50/50 p(MMA/nBA) copolymer as a function of temperature.
Figure 11:
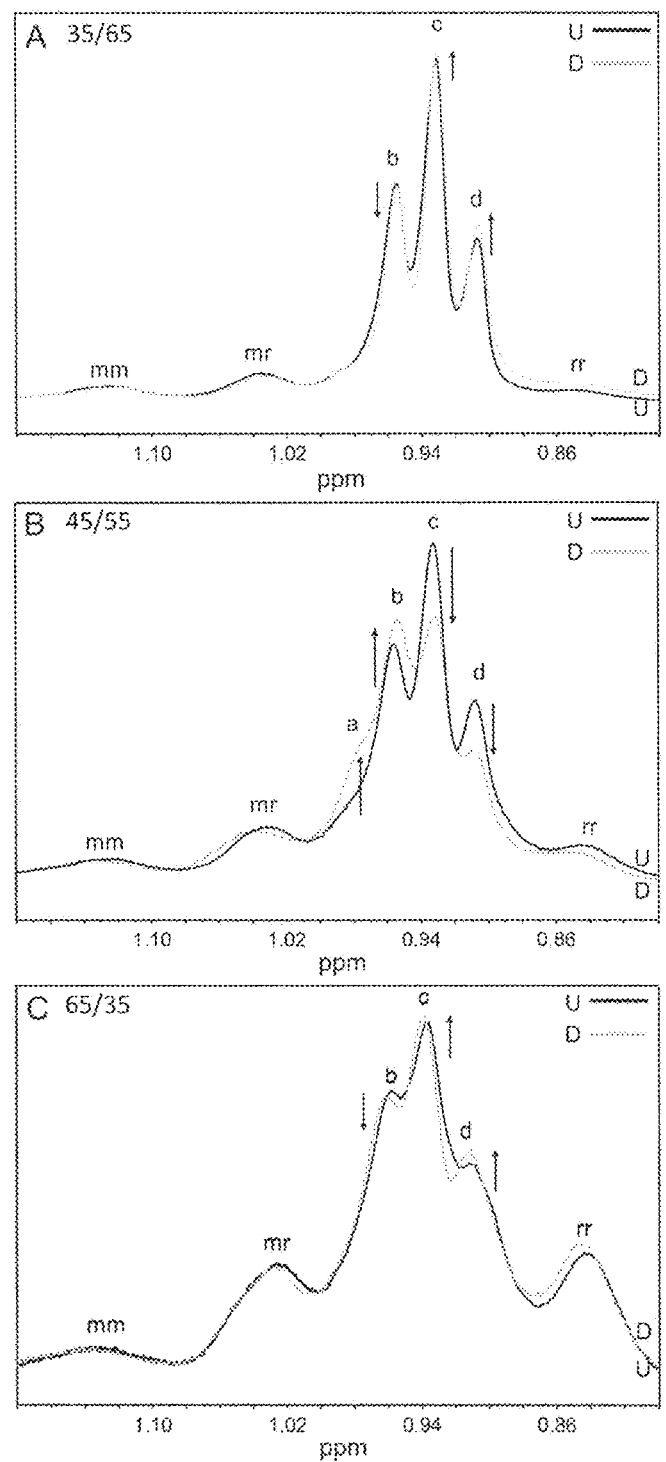
FIG. 11 graphically illustrates $^1$H NMR spectra of p(MMA/nBA) copolymers with 35:65 (A), 45:55 (B), and 65:35 (C) molar ratios for undamaged (U) and after (D) damaged states. Peaks a-d represent the combined —CH$_3$ resonances of the MMA backbone and nBA side groups.
Figure 12A:
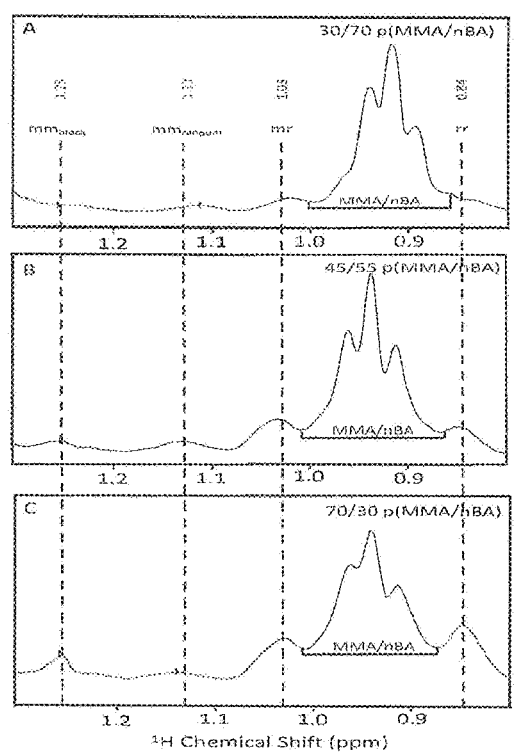
FIG. 12A graphically illustrates $^1$H NMR of α-CH$_3$ protons of MMA and side group —CH$_3$ protons of nBA for the following p(MMA/nBA) compositions: A—30/70, B—50/50, C—70/30.
Figure 13:
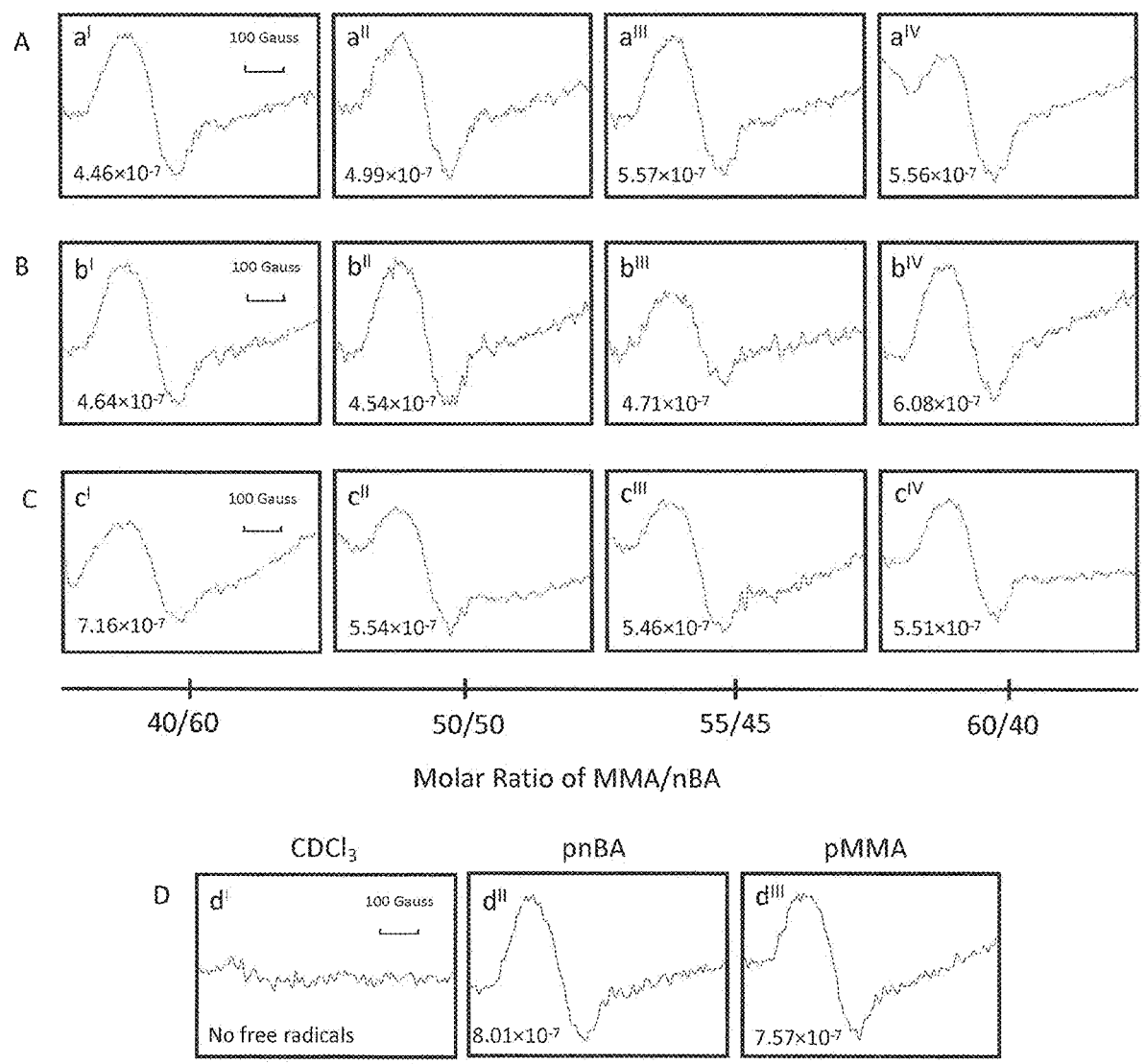
FIG. 13 graphically illustrates ESR spectra of (A) damaged p(MMA/nBA) copolymers synthesized via ATRP; (B) damaged p(MMA/nBA) copolymers synthesized via emulsion polymerization with $M_n$ ranging from 300-5000 kDA, and (C) blends of high mol. wt. pMMA (1000 kDA) and pnBA (5000 kDA) homopolymers upon mechanical damage. For each type of copolymer or blend, MMA/nBA compositions were varied as following: 40/60 ($a^I$-$c^I$), 50/50 ($a^{II}$-$c^{II}$), 55/45 ($a^{III}$-$c^{III}$), and 60/40 ($a^{IV}$-$c^{IV}$). (D) Pure CDCl$_3$ ($d^I$), pnBA (5000 kDA) ($d^{II}$), and pMMA (1000 kDA) ($d^{III}$) homopolymer controls. The free radical concentrations calculated from the signal-to-noise ratio are shown in the lower left corner of each spectrum [mol/L].

To experimentally assess molecular events associated with self-healing or lack thereof, we utilized internal reflection infrared imaging (IRIRI), proton nuclear magnetic resonance ($^1$H NMR), electron spin resonance (ESR), stress-strain analysis and dynamic mechanical analysis (DMA). The results of these experiments show that reversible spectroscopic changes are only observed for self-healable copolymer compositions. In IR analysis illustrated in FIGS. 8 and 9 the spectroscopic changes are manifested by the intensity changes of the C=O (1728 cm$^{-1}$) and C—O—C(1158 cm$^{-1}$) normal vibrations due to conformational changes of MMA and nBA repeating units. In $^1$H NMR, the key features are the changes of the methyl group shielding-deshielding during the damage-repair cycle for self-healing copolymer compositions as illustrated in FIGS. 11, 10, 12A, 12B, 13 and reported in Table 9). Upon mechanical damage, the resonances at 0.98 ppm (a) and 0.96 ppm (b) increase, indicating deshielded, at the expense of diminishing 0.93 ppm (c) and 0.90 ppm (d) peaks, indicating shielded, suggesting a closer chain packing. If strong vdW forces contribute to inter-chain cohesiveness, mechanical damage will alter the distribution of shielded and deshielded methyl groups along the polymer backbone. Since mechanical damage may also lead to the formation of free radicals, ESR analysis of damaged copolymers showed that, regardless of the copolymer composition, the concentration levels of free radicals are in the 4.5-8×10$^{-7}$ mol/l range, as illustrated in FIG. 13, and appear to have no relationship to self-healing. Junction densities (vi) due to chain entanglements or adjacent chain interactions were obtained from the measurements of viscoelastic length transitions (VLT) in dynamic mechanical analysis (DMA) as a function of copolymer composition as illustrated in FIG. 6 and reported in Table 8. For pMMA and nBA homopolymers, the $v_j$ values are 93.1 and 60 mol/m$^3$, respectively, but significant increase up to 123.6 mol/m$^3$ is observed for self-healable compositions. In summary, visual observations, higher $v_j$, closer chain packing after mechanical damage, and recovery of conformational changes upon mechanical damage are the primary differences between self-healing and none self-healing compositions.

To further understand how copolymer structural features and properties are related to self-healing, molecular dynamic (MD) simulations were employed under isothermal (NVT) and isoenergetic equilibration (NVE) conditions as a function of copolymer composition. Using MD simulations copolymer conformations, end-to-end distances (r), and cohesive energy densities (CED) were determined. These results are plotted in FIG. 2A and summarized in Tables 2 and 3. Curve a of FIG. 2A shows that the equilibrium cohesive energy densities ($CED_{eq}$), as well as the end-to-end chain distances ($r_{eq}$), Curve a', both reach maxima for self-healable at 45/55 to 50/50 pMMA/nBA compositions referred to as Range II. Copolymer inter-chain packing, illustratd in FIG. 2B is greater within self-healing compositional Range II, whereas non-self-healable Ranges I and III exhibit less interwinding chains. Further, representative copolymer chains extracted from each range, shown in FIG. 2C, indicate that, within self-healing Range II, the chains exhibit extended helix-like conformations with an average $r_{eq}$ values of ~34 Å, whereas within Ranges I and III, globular shapes with $r_{eq}$ values in the ~25-29 Å are observed. The results of MD simulations are summarized in Table 1 and show that the CED values upon reaching equilibrium ($CED_{eq}$) increase for self-healing composition Range II. However, within Range II, the $vdW_{eq}$ values reach 1.96×10$^5$ kJ/m$^3$, thus indicating that the extended-chain helix-like conformations are energetically preferable. It is also useful to examine chain conformations equilibrated in the absence of inter-chain vdW interactions for all compositions. The results of MD simulations for single 30/70, 45/55, and 70/30 p(MMA/nBA) chains shown in FIG. 2D illustrate that, regardless of the copolymer composition, globular conformations, similar to the non-self-healable compositions, Ranges I and III, are preferable and the single chain end-to-end distances ($r_{eq}$) are within the 21.7-27.8 Å range. Thus, without inter-chain vdW inter-chain interactions, globular chain conformations prevail regardless of the copolymer topology.

In all MD simulations the experimental average copolymer density of 1.125 g/cm$^3$ was used. Using these values, in separate simulations, copolymer chains were allowed to have excess of a free volume, thus enabling chain motion in and out of the physical cell boundaries upon reaching an equilibrium. The premise behind these simulations was to examine what is the role, if any, of vdW interactions as a function of copolymer composition on their ability to return to higher or lower density states. Assuming the initial density of 0.50 g/cm$^3$, respective copolymer chains were isothermally equilibrated. Only for the self-healing compositions, represented by Range II, density increases to 0.53-0.54 g/cm$^3$ were observed, whereas for non-self-healing compositions, the density decreased, as illustrated in FIG.

13, supporting the hypothesis that enhanced vdW forces facilitate favorable inter-chain interactions and return to denser packing upon physical separation. The question arisen from these experimental and modeling exercises is what the molecular entities within this narrow compositional range that lead to stronger inter-chain interactions and subsequent self-healing.

TABLE 1

| MMA/nBA Molar Ratio | $CED_{eq} \pm 0.05$ ($10^5$ kJ/M$^3$) | $CED_{hi} \pm 0.05$ ($10^5$ kJ/M$^3$) | $vdW_{eq}$ density $\pm 0.05$ ($10^5$ kJ/M$^3$) | $r_{eq} \pm 0.2$ (Å) | $f_{eq} \pm 0.01$ | $\Delta H_{eq} \pm 0.08$ ($10^3$ kJ/mol) |
|---|---|---|---|---|---|---|
| 100/0 | 1.95 | 2.08 | 1.87 | 27.7 | 0.696 | −6.64 |
| 70/30 | 1.71 | 1.84 | 1.53 | 25.8 | 0.762 | −6.58 |
| 55/45 | 1.58 | 1.86 | 1.35 | 29.6 | 0.64 | −6.45 |
| 50/50 | 1.99 | 1.99 | 1.91 | 34.1 | 0.521 | −8.11 |
| 45/55 | 2.03 | 2.01 | 1.96 | 34.0 | 0.523 | −8.32 |
| 40/60 | 1.41 | 1.92 | 1.30 | 30.0 | 0.625 | −5.88 |
| 30/70 | 1.72 | 1.98 | 1.44 | 28.8 | 0.66 | −7.26 |
| 0/100 | 1.67 | 1.68 | 1.49 | 25.9 | 0.758 | −7.93 |

Table 1 illustrates the cohesive energy density of equilibrated ($CED_{eq}$) and forced helix-like ($CED_{hi}$) p(MMA/nBA) copolymer conformations, van der Waals (vdW) density, end-to-end distance ($r_{eq}$), flexibility parameter ($f_{eq}$), and enthalpy changes ($\Delta H_{eq}$) as a function of MMA/nBA molar ratios. The boxed rows indicate self-healing copolymer compositions represented by Range II of FIG. 2.

Figure 3:
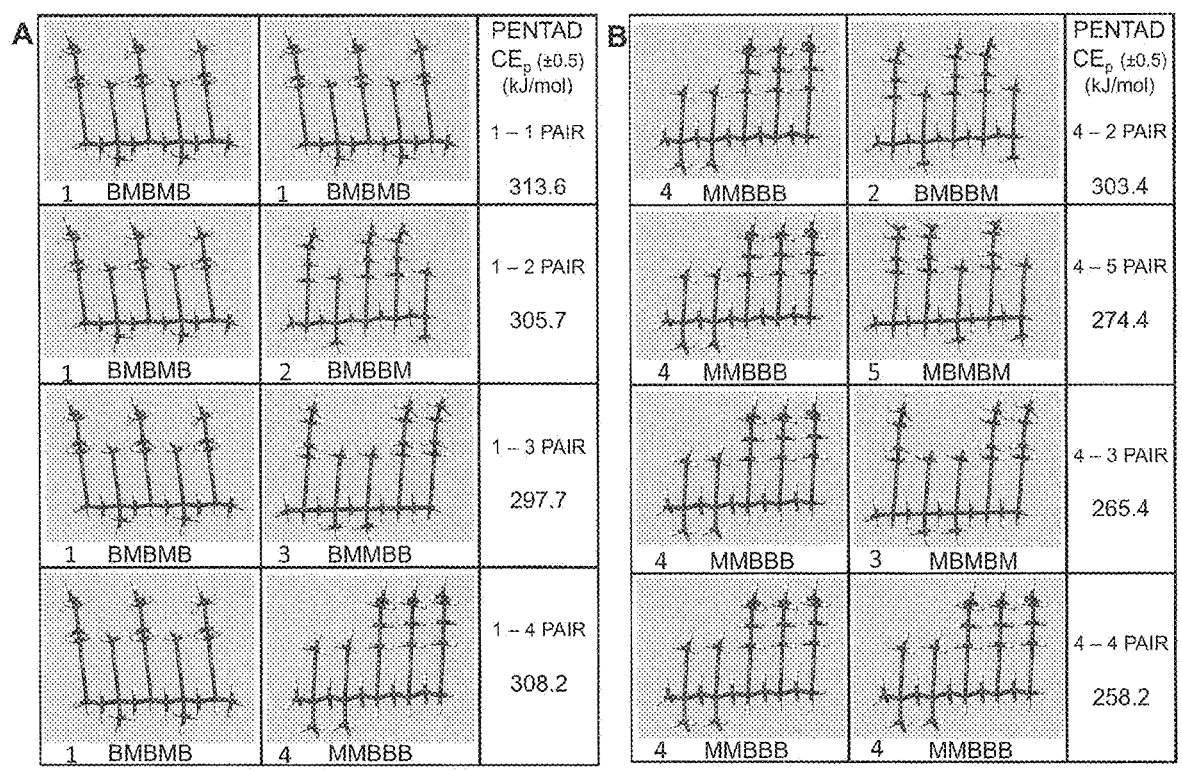
FIG. 3 illustrates the cohesive energies ($CE_p$) for selected pentad pair combinations: A—(1-1), (1-2), (1-3), (1-4); B—(4-2), (4-5), (4-2), (4-4) pentad pair interactions; where: 1—BMBMB, 2—BMBBM, 3—BMMBB, 4—MMBBB, 5—MBMBM.

The role of monomer sequences and the vdW contributions to self-healing, vdW forces and cohesive energies ($CE_p$) for model pentads containing selected sequences of M and B monomer units, where M and B represent MMA and nBA monomers, respectively were examined. Under NVT MD conditions, selected pentads were placed into one cell and equilibrated. FIG. 3A illustrates BMBMB/BMBMB, BMBMB/BMBBM, BMBMB/BMMBB, and BMBMB/BBMMM pentad pairs and the $CE_p$ values due to their interactions. The highest $CE_p$ value (~313.6 kJ/mol) exhibit alternating BMBMB/BMBMB pairs. In contrast, increases block polymer formation to form BBMMM/BBMMM pentads and their combinations, as illustrated in FIG. 3B, have the lowest $CE_p$ values of 258.2 kJ/mol, thus indicating that the alternating BMB-type monomer sequences of the neighboring chains favor overall higher $CE_p$ values. Notably, for alternating BMBMB-type segments composed of MMA (M) and nBA (B) units, there is an average ~120 Å$^3$ space (~7.1×4.2×4.0 Å) between two neighboring nBA monomers separated by one MMA unit along one chain, thus being spatially capable and energetically favorable of hosting an nBA unit of an adjacent chain, thus enabling the 'key-and-lock' interactions stabilized by vdW forces.

Figure 2:
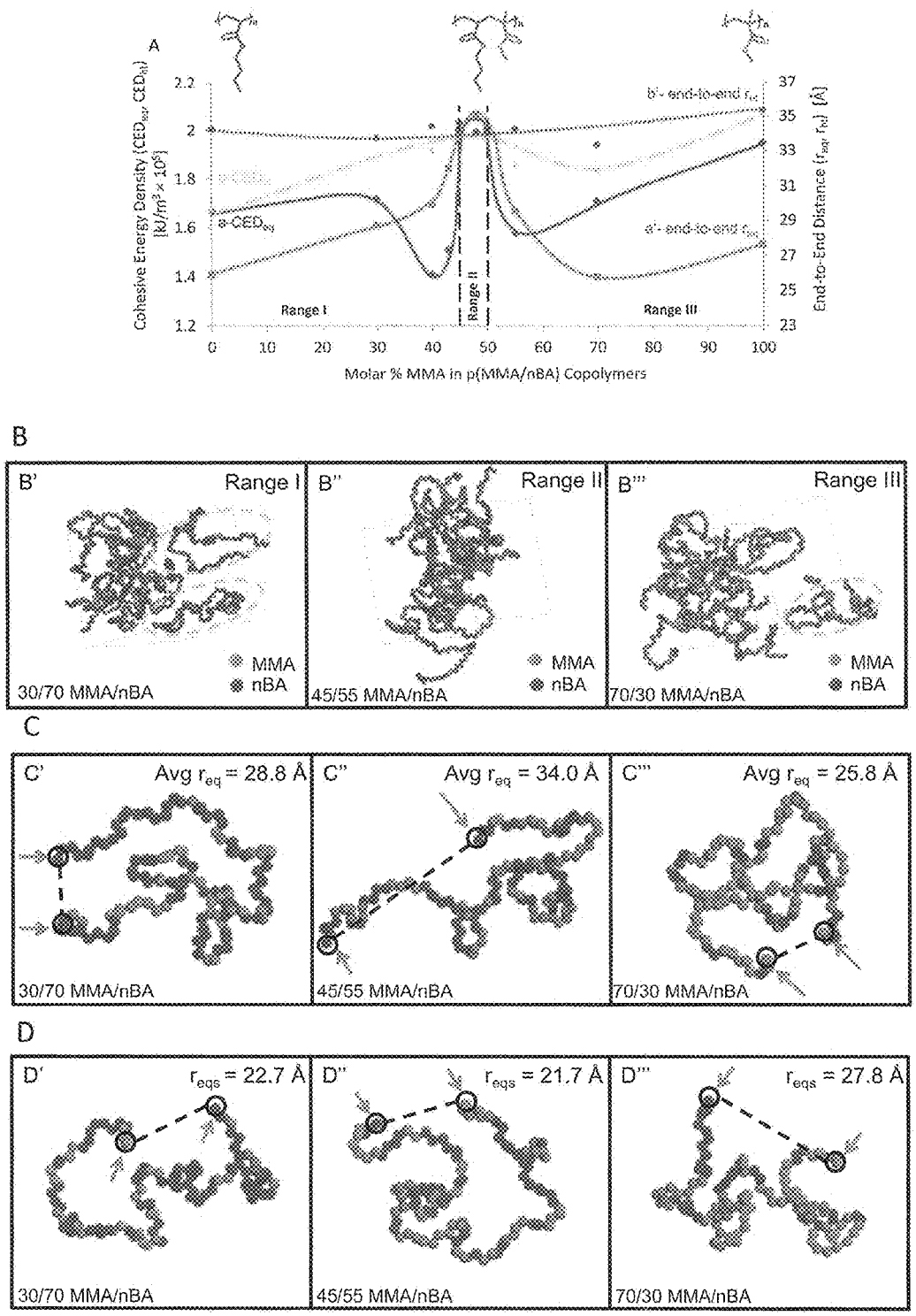
FIG. 2 graphically illustrates the cohesive energy densities at equilibrium ($CED_{eq}$) (a), end-to-end equilibrium distances ($r_{eq}$) (a'), cohesive energy densities ($CED_{hi}$) of forced helical conformations (b), and end-to-end chain distances for forced helical conformations ($r_{hi}$) (b') as a function of molar % MMA in p(MMA/nBA) copolymers and representative examples of copolymer morphologies in the Range I (MMA/nBA molar ratio: 30/70), Range II (MMA/nBA molar ratio: 45/55), and Range III (MMA/nBA molar ratio: 70/30); circles denotes examples of extracted chains. C. Average end-to-end distances for macromolecular chains extracted from MD simulations in FIG. 2, B. D. Average end-to-end distances ($r_{eqs}$) for single isolated chains in the Range I (MMA/nBA molar ratio: 30/70), Range II (MMA/nBA molar ratio: 45/55), and Range III (MMA/nBA molar ratio: 70/30) wherein the $r_{eq}$ and $r_{eqs}$ values were measured from 3D chain images and may appear not to scale.

Helix-like chain conformations may also contribute to the high $CED_{eq}$ values within self-healable compositions such as Range II of FIG. 2. To examine this hypothesis cohesive energy densities were examined for fixed helix-like conformations ($CED_{hl}$) as a function of copolymer composition. All copolymers across the compositional range were forced to retain a 34.0±0.2 Å end-to-end distance, as illustrated in FIG. 2C", and extended helix-like chain conformations of the 45/55 self-healable copolymer. The results are summarized in Table 1, and comparison of $CED_{eq}$ and $CED_{hl}$ values is plotted in FIG. 2A as Curves b and b', respectively. As shown, regardless of p(MMA/nBA) composition, the $CED_{hl}$ values are higher compared to their corresponding $CED_{eq}$ counterparts, suggesting that the helix-like conformations resulting from alternating monomer sequences are the main contributing factors to higher $CED_{eq}$ and strong vdW inter-chain forces. The monomer sequence contributions to self-healing copolymers represented by Range II of FIG. 2 are also supported by the most negative $\Delta H_{eq}$ values as reported in Table 1. Since pMMA-b-nBA block copolymers do not self-heal and exhibit lower $CED_b$ values, as reported in Table 10, these results further substantiate that the presence of alternating/random BMBMB-like sequences favor strong inter-chain vdW interactions reflected in higher vdW densities facilitating self-healing as reported in Table 1 in the boxed rows. Average MMA and nBA reactivity ratios of $r_1$=1.75-3.15 and $r_2$=0.2-0.39 indicate that it is unlikely for copolymers in the Range II of the composition range to form purely alternating copolymers. However, $^1$H NMR analysis shows the presence of some homomonomer sequences manifested by the presence of CH$_3$ protons due to MMA triads as Illustrated in FIGS. 12A and 12B and reported in Tables 11 and 12 for self-healing compositions represented by Range II. The content of MMA triads is relatively small. To further substantiate these experimental results, MD simulations conducted for average $r_1$ and $r_2$ values of 2.61 and 0.36, respectively, showed that the maximum CED values are still reached for self-healing compositions as reported in Table 13. The probability of finding alternating topologies are also greater, as reported in Table 14, and chain conformations follow the same trend.

Figure 4:
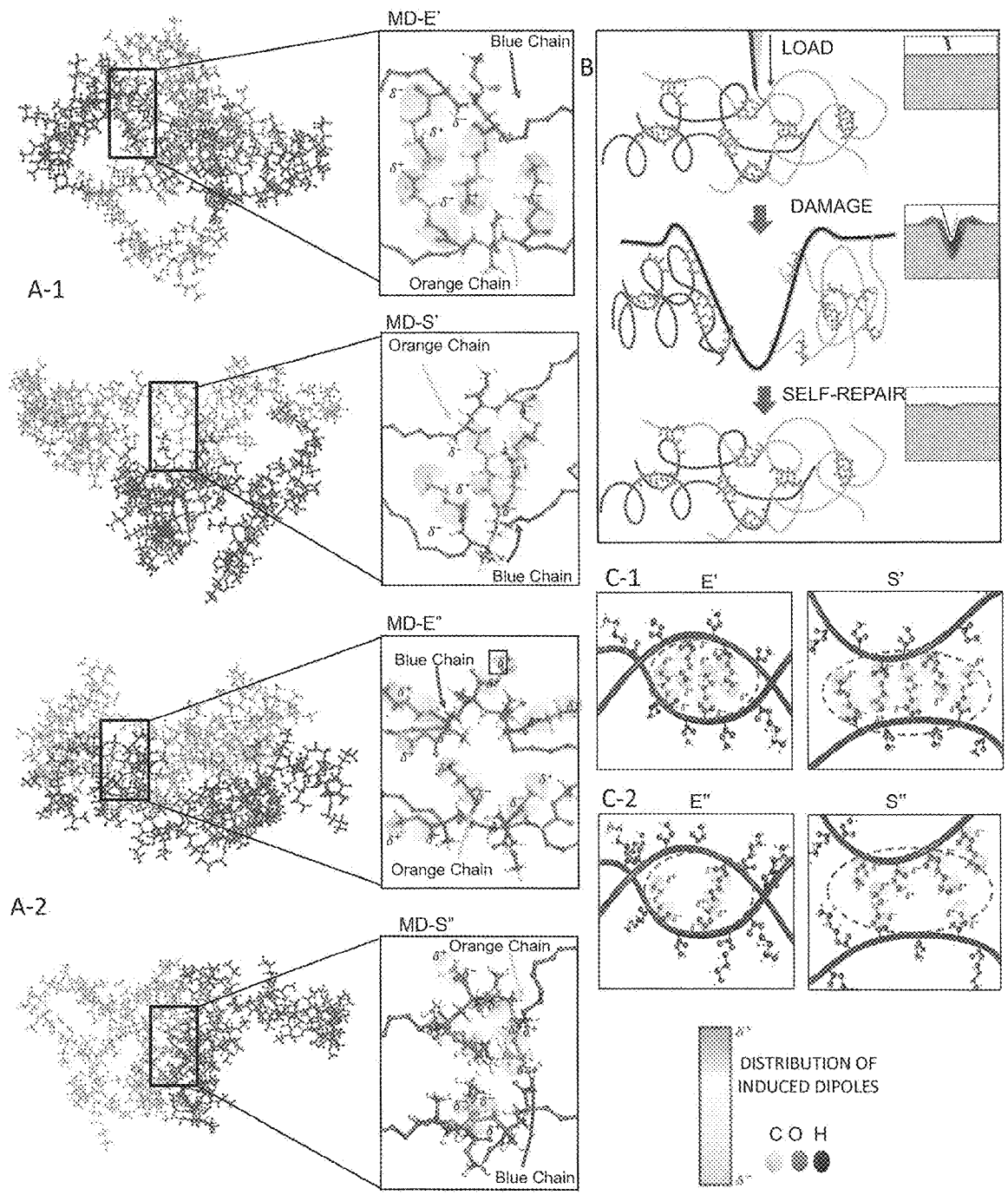
FIG. 4 illustrates in A1 extracted inter-chain interactions from MD simulations for self-healable compositions (Range II) of entangled (MD-E') and side-by side (MS-S') chains; in A2 extracted inter-chain interactions from MD simulations for none self-healable compositions (Range III; 55/45 MMA/nBA ratio) of entangled (MD-E') and side-by side (MS-S') chains. To visually differentiate copolymers, the neighboring chains were colored in orange and blue. The color scale represents relative distributions of induced dipoles due to vdW interactions (red-high; blue-low). B. Proposed self-healing mechanism responsible for the restoration of van der Waal interactions; the presence of 'key-and-lock' associations (red) facilitates chain recovery upon mechanical damage. C1. Pictorial representation of the distribution of induced dipole moments in self-healable entangled (E") and side-by side (S") chains. C2. Pictorial representation of distribution of induced dipole moments for none self-healable entangled (E″) and side-by side (S″) chains.

A lack of interfacial fluidity attributed to the elevated $T_g$ at damage on the MMA-rich compositional end, represented by compositional Range III, and limited quantities of vdW interactions on the MMA-poor end, represented by compositional Range I, inhibit self-healing outside the 50/50-45/55 region designated Range II herein. Because the increase of the $CED_{eq}$ values parallels the increasing number of neighboring MMA/nBA units, as illustrated in FIGS. 12A and 12B, the formation of 'key-and-lock' configurations of the adjustment chains within Region II will be favorable for alternating/random copolymer topologies, as reflected by higher dielectric constants and junction densities. Assuming that chain entanglements (E) and side-by-side (S) chains are the primary contributors to enhanced junction densities (vi) experimentally obtained in DMA measurements, as reported in Table 8, we extracted both types of interactions from MD simulations and examined the distribution of the induced dipoles due to vdW interactions contributing to the enhanced ε values. FIG. 4, A1 illustrates that within the self-healing Range II, $\delta^+$-$\delta^-$ induced dipole interactions dominate the entanglement (MD-E') and side-by-side (MD-S') chain interactions. In contrast, FIG. 4, A2 shows extracted copolymer chains just outside the self-healable range, composition Range III, in which randomized orientation of induced dipoles for entangled (MD-E") and side-by-side (MD-S") chains dominate. As we recall, the $v_j$ values significantly increased for self-healing compositions clearly supporting MD predictions. It should be noted that enhanced segmental chain mobility within interfacial regions generated during damage may also aid to self-healing process due to lower $T_g$ values near-surfaces which can be boosted by collective structural rearrangements at the interfacial regions.

Further evidence for inter-chain interactions can be found in determining the flexibility parameter, ($f_{eq}$), defined as the fraction of bonds capable of bending out of the collinear direction of previous segments expressed as $$f_{eq} = \frac{r_{max}}{r_{eq}^2(l(2-f))}$$

(where: $r_{max}$ is fully extended chain length, $r_{eq}$ is the end-to-end distance obtained from MD simulations, and l is length of the repeat unit). The $f_{eq}$ values as a function of copolymer composition are summarized in Table 1. When chains are in the equilibrium state ($f_{eq}$), the chain flexibility is the smallest for self-healing compositions, indicating that if chains are deformed due to external forces, they will store energy and act like mechanical springs capable of returning to the original state. As was shown for pentad model MD simulations illustrated in FIG. 3, these interactions are stabilized by BABAB/BABAB 'key-and-lock' junctions between neighboring chains, resulting in recovery upon displacement. Similar behavior is observed for methylmetacrylate/n-pentyl acrylate (MP) and methylmetacrylate/n-hexyl acrylate) (MH) based pentads, as reported in Tables 11-14, in which also alternating copolymer compositions favor enhanced $CED_p$. The optical images, illustrated in FIG. 15a, of selected copolymer compositions show similar self-healing behavior. Stress-strain curves recorded before and after damage are strong indicators of mechanical property recovery after ~14 hrs as illustrated in FIG. 15b.

Based on the experimental evidence and MD simulations, the following self-healing mechanism is proposed. With reference to FIG. 4B, the presence of strong vdW inter-chain forces for predominantly alternating/random copolymer compositions forming helix-like conformations create a viscoelastic response that energetically favors self-recovery upon chain separation due to 'key-and-lock' associations of neighboring chains. In the presence of these interactions vdW forces stabilize 'key-and-lock' neighboring junctions reflected in the enhanced $CED_{eq}$ values. When chains are separated as a result of mechanical damage and an external force is removed, copolymer chains return to their initial conformations by restoring helix-like chain conformations in a spring-like manner and reforming 'key-and-lock' junctions manifested by increased $CED_{eq}$ and $r_{eq}$ distances for the self-healing compositions referred to herein as Range II as illustrated in FIGS. 16A and B. Outside self-healing compositions, referred to herein as Ranges I and III, irreversible chain dislocations and insufficient inter-chain vdW forces inhibit complete chain recovery. Thus, the presence of induced dipole interactions due to directional vdW forces enhance $CED_{eq}$ of entangled (E') and side-by-side (S') chains. In contrast, for none self-healable compositions, induced dipoles are random.

Figure 17:
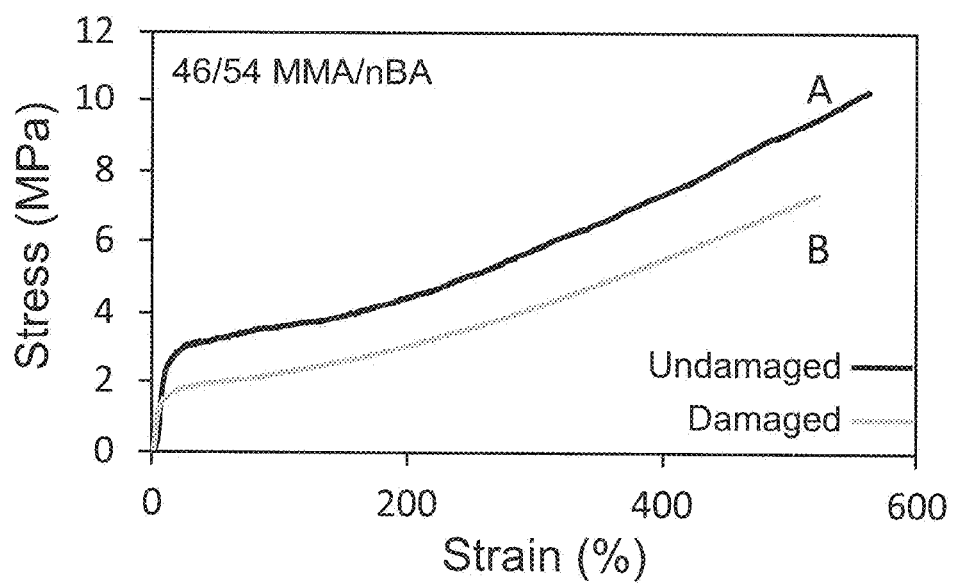
FIG. 17. Stress-strain measurements of undamaged (Curve A) and self-healed (80 hrs) (Curve B) p(MMA/nBA) copolymer film (Actual MMA/nBA molar ratio: 46/54)

Of particular importance is the fact that large scratches, not only 20-30 μm scratches, can be self-repaired. To illustrate that vdW interactions can be highly effective in self-healing of thermoplastic materials, ~200 μm thick 46/54 p(MMA/nBA) film was severed and physically reattached. After reattachment, self-healing occurred with a few minutes, but to regain ~70-85% mechanical properties it took ~80 hrs under ambient conditions. The tensile strength of these materials before damage and after self-healing is in the range of 6-9 MPa as illustrated in FIG. 17. For comparison, when supramolecular interactions, such as H-bonding, were employed in self-healing of rubber, a tensile strength ~3.5 MPa at similar elongation levels was reached. Although the underlying mechanisms responsible for self-healing are substantially different, the the nature of these interaction may result in somewhat similar properties. Considering directionality and polarity as commonly accepted difference between H-bonding and vdW interactions, the former facilitates localized bonding directionality due to the orientation of interacting molecular orbitals and high polarity or hydrophilicity. The main feature of vdW interactions is high polarizability, hydrophobicity, with a tendency to form ubiquitous non-directional contacts between neighboring macromolecular segments. However, in layered systems with large individual atomic planes, individual weak vdW attractive forces in two-dimensional materials, such as graphene and others, are directional and become collectively strong offering many advantages and may display many optical properties found in metals, such as plasmonic oscillators; semiconductors, such as excitons; or insulators, such as phonon resonances. In amorphous polymers, at first approximation, vdW interactions are non-directional, but the magnitude of vdW forces will strongly depend on the proximity of the neighboring units. As extended semi-helix macromolecules are in closer proximity to their alternating/random copolymer neighbors, vdW interactions will increase due to orientation of the side groups resulting in interdigitated 'key-and-lock' inter-chain morphologies that facilitate self-healing.

Figure 16:
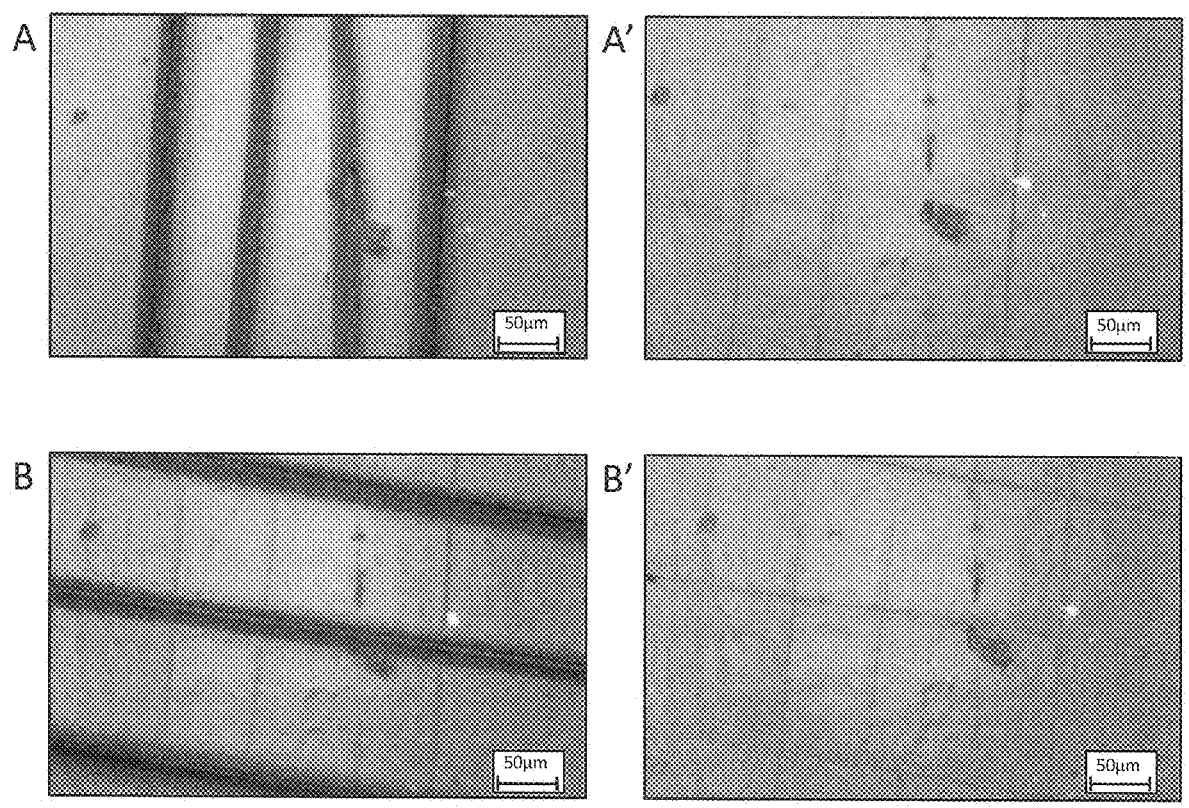
FIG. 16 illustrates the repetitive damage and self-healing: A and A' are optical images of 45/55 p(MMA/nBA) film that was damaged by making four parallel cuts (A) and allowed to self-heal for ~14 hrs (A'). New, perpendicular cuts were made on the same previously self-healed film (B) and allowed to self-heal again for ~14 hrs (B'). Cutting over the same area does not affect self-healing efficiency.

If interdigitated short side groups, such as in MMA, and longer side groups, such a nBA, nPA, nHA are capable of 'key-and-lock' associations, it is anticipated that copolymers with similar topologies may also exhibit self-healing behavior without elaborate and often unpractical chemical modifications. Instead, 'fine tuning' of copolymer topologies and compositions may serve this purpose. This simple concept of the copolymer programming utilizing sequencing motifs in commodity copolymers by selecting monomers with desirable reactivities favoring 'key-and-lock' vdW interactions may inspire the developments of new technologies to produce sustainable and functional materials capable of self-healing and the damage-repair cycle can be repeated many times on the same area as illustrated in FIG. 16.

These studies provide a unique opportunity for reinventing ubiquitous commodity copolymers by controlling their composition and converting them into sustainable self-healable materials. If designed properly, thermoplastic materials may require no additional chemical modifications by taking advantage of increased vdW forces forming 'keyand-lock' inter-chain interactions. FIG. 4, C1 and C2 is a pictorial representation of entangled and side-by-side chains for self-healable copolymers in composition Range II and none self-healable compositions in compositional Ranges I and III, respectively. Favorable recovery that enables mechanically separated copolymer chains to rejoin without external intervention is one of the key features for the successful development of self-healing thermoplastics. The choice of monomers and desirable monomer sequences along copolymer backbone that enable 'key-and-lock' interactions will be critical. The advantage of using strong vdW interactions over other chemical or physical modifications may offer cost-effective, extended lifetime polymer-based commodity materials with sustainable properties and numerous practical applications. Notably, vdW forces are known to play a key role in the shape formation enabling functions of large bioactive macromolecules, such as proteins and DNA. There is no reason why vdW forces and H-bonding should not play a significant role in self-healing synthetic materials, but the wide ranges of strengths make the design and analysis of these processes experimentally challenging. Undoubtedly, the nature of the interfaces and their control via H-bonding and vdW interactions in polymeric materials with spatially bounded copolymer planes may lead to a number of unprecedented optical and mechanical properties characteristic of classical vdW materials. The concept of design of commodity copolymers with favorable vdW interactions may facilitate many technological opportunities for reinventing existing and developing new copolymers that exhibit self-healing. These materials without external intervention will enable autonomous repairs, thus reducing costly maintenance and improving safety in construction, oil and gas transport, and wind energy. Electronic, consumer products, biomedical, military, automotive and aerospace industries will benefit from these developments as many copolymers are utilized in the end products.

EXAMPLES

Copolymer Synthesis
Materials

Methyl methacrylate (MMA), n-butyl acrylate (nBA), hexyl acrylate (HA), ethyl α-bromoisobutyrate (eBiB), α-bromoisobutyryl bromide (BBIB), Cu(I)Br, potassium persulfate (KPS), N,N,N',N'',N''-Pentamethyldiethylenetriamine (PMDTA) and 2,2'-Azobis(2-methylpropionitrile) (AIBN) were purchased from Sigma-Aldrich. Toluene, hexane tetrahydrofuran (THF), dimethylformamide (DMF), methanol (MeOH) and chloroform were purchased from Thermo Fisher-Scientific. N-pentyl acrylate (nPA) was purchased from Scientific Polymers. All monomers were purified prior polymerization using neutral activated aluminum oxide (Sigma Aldrich).

Atom Transfer Radical Polymerization (ATRP)

In a typical ATRP experiment, a total of 76.90 mmol of MMA and nBA monomers, with variable MMA/nBA ratios, depending upon composition, and 0.26 mmol of eBiB were dissolved in 10 ml of toluene. In a separate reaction vessel, 0.51 mmol of PMDTA ligand was added to 20 ml of toluene. Both solutions were purged with $N_2$ for 40 minutes and combined. In the last step, a $N_2$ purged solution of 0.39 mmol of Cu(I)Br in 1 ml of DMF was added. Upon initiation of reaction at 75° C., after 10 min, 5 ml of DMF was added. After 24 hr, the reaction was terminated by exposure to air. The resulting copolymers were precipitated in hexane and centrifuged (5 min, 10,000 rpm). The same procedure was employed to copolymerize p(MMA/nBA) with the following molar feed ratios (f): 70/30, 65/45, 60/40, 55/45, 50/50, 45/55, 40/60, 35/65 and 30/70. The actual monomer ratios (F) in each copolymer were determined using $^1H$ NMR. Physical properties of copolymers are summarized in Table 2. Copolymer films were prepared by dissolving each copolymer in THF solvent (0.15 g/ml) and casting films in a 4×1 cm polytetrafluoroethylene mold. Upon solvent evaporation at 75° C. over a period of 48 hrs, copolymer films with a thickness of ~250 μm were obtained.

Colloidal Synthesis of High Mol. Wt. p(MMA/nBA) Copolymers

In a typical experiment, 50 ml of water in a reaction vessel was purged with $N_2$ and heated to 75-78° C. Following the addition 5 ml of 1% w/v KPS initiator, a total of 0.05 mol of MMA and nBA monomers with variable MMA/nBA ratios, depending upon composition, while maintaining a constant monomer:KPS molar ratio of 250:1, were injected into the solution, and the reaction proceeded for 5 h. Upon termination, the copolymer solution was precipitated by centrifuging for 1.5 hours at 10,000 rpm and the final product was dissolved in THF prior to film formation. Physical properties of the high mol. wt. copolymers are listed in Table 2-3. In Table 2 $M_n$, $M_w$, and D, $T_g$, and self-healing efficiency for MMA/nBA copolymers are reported. In Table 3 the corresponding $M_n$, $M_w$, and D, $T_g$, and self-healing efficiency values of high mol. wt. p(MM/nBA) copolymers are reported

TABLE 2

| MMA/nBA Molar Feed Ratio (f) | Actual MMA/nBA Molar Ratio (F)* | $M_n$ (Da) | $M_w$ (Da) | D | $T_g$ (K)(±1) | Self-Healing** |
|---|---|---|---|---|---|---|
| 70/30 | 68/32 | 31816 | 41049 | 1.29 | 303 | − |
| 65/35 | 63/37 | 32039 | 47559 | 1.48 | 297 | − |
| 60/40 | 61/39 | 29138 | 37222 | 1.28 | 296 | − |
| 55/45 | 57/43 | 22520 | 28492 | 1.27 | 285 | − |
| 50/50 | 51/49 | 19359 | 23395 | 1.21 | 278 | + |
| 45/55 | 44/56 | 27532 | 36908 | 1.34 | 269 | + |
| 40/60 | 36/64 | 19448 | 24521 | 1.26 | 242 | − |
| 35/65 | 31/69 | 30726 | 43436 | 1.41 | 238 | − |
| 30/70 | 28/72 | 27317 | 40872 | 1.50 | 235 | − |

*determined by $^1H$ NMR
**'+' denotes self-healing; '−' no self-healing

TABLE 3

| MMA/nBA Feed Ratio (f)*** | $M_n$ (Da) | $M_w$ (Da) | D | $T_g$ (K) (±1) | Self-Healing** |
|---|---|---|---|---|---|
| 55/45 | 878000 | 1799000 | 2.05 | 291 | − |
| 50/50 | 159000 | 774000 | 4.85 | 268 | + |

TABLE 3-continued

| MMA/nBA Feed Ratio (f)*** | $M_n$ (Da) | $M_w$ (Da) | Đ | $T_g$ (K) (±1) | Self-Healing** |
|---|---|---|---|---|---|
| 45/55 | >1000000 | — | — | 253 | + |
| 40/60 | >1000000 | — | — | 243 | − |

***'+' denotes self-healing; '−' no self-healing
***actual MMA/nBA molar ratios (F) determined by $^1$H NMR are within 1-2% of the feed ratios (f).

Statistical p(MMA/nBA), p(MMA/n-PA), and p(MMA/HA) Copolymerization

Statistical copolymers were synthesized using a solution free radical polymerization. A total of 0.042 mols of monomers with appropriate MMA/nBA molar ratios, depending upon composition, were dissolved in 5 ml of toluene. After 5 min, 2.5 mg of AIBN initiator was added into the reaction vessel. The reaction was conducted at 75° C. for 8 hrs to yield p(MMA/nBA), p(MMA/nPA) and p(MMA/HA) copolymers. Their properties are listed in Table 4 wherein $M_n$, $M_w$, Đ, $T_g$, and self-healing efficiency for p(MMA/nBA), p(MMA/nPA) and p(MMA/HA) copolymers as a function of composition (F) are reported. The reaction times for p(MMA/nPA) and p(MMA/HA) copolymers were 5 hrs. The resulting copolymers were dissolved in 10 ml toluene and precipitated in hexane.

TABLE 4

| Monomer Feed (f) | Actual Copolymer Composition (F)* | $M_n$ (Da) | $M_w$ (Da) | Đ | $T_g$ (K)(±1) | Self-Healing |
|---|---|---|---|---|---|---|
| 40/60 p(MMA/nBA) | 37/63 p(MMA/nBA) | 32607 | 75966 | 2.33 | 248 | − |
| 45/55 p(MMA/nBA) | 46/54 p(MMA/nBA) | 68962 | 163493 | 2.37 | 272 | + |
| 50/50 p(MMA/nBA) | 53/47 p(MMA/nBA) | 44603 | 86518 | 1.94 | 283 | + |
| 55/45 p(MMA/nBA) | 57/47 p(MMA/nBA) | 45801 | 120029 | 2.62 | 300 | − |
| 40/60 p(MMA/nPA) | 45/55 p(MMA/nPA) | 48824 | 94131 | 1.93 | 266 | + |
| 50/50 p(MMA/nPA) | 53/47 p(MMA/nBA) | 73049 | 141918 | 1.94 | 275 | + |
| 60/40 p(MMA/nPA) | 59/41 p(MMA/nPA) | 53960 | 108292 | 2.00 | 285 | − |
| 40/60 p(MMA/HA) | 43/57 p(MMA/HA) | 53349 | 113561 | 2.13 | 261 | + |
| 50/50 p(MMA/HA) | 54/46 p(MMA/HA) | 46201 | 94332 | 2.04 | 273 | + |
| 60/40 p(MMA/HA) | 61/39 p(MMA/HA) | 68502 | 141374 | 2.06 | 285 | − |

*determined by $^1$H NMR

ATRP of pMMA-b-pnBA Block Copolymer

PMMA-b-pnBA copolymers were copolymerized using BBIB initiator in order to attain desirable block topologies. Initially, 0.25 mmol of MMA or nBA, were combined with 0.13 mmol of BBIB in 15 ml of DMF. In a separate reaction vessel, 0.25 mmol of PMDTA ligand and 0.195 mmol of Cu(I)Br catalyst were dissolved in 10 ml of DMF. The resulting solutions were combined under $N_2$ atm. and purged for 40 min. The reaction was conducted at 75° C. for 4 hrs and terminated by exposure to air. The resulting single block copolymers were precipitated and washed in MeOH. Subsequent blocks were synthesized by copolymerizing either MMA or nBA monomers in the same manner. The same process was repeated 2-3 times, resulting in 3 and 5 block copolymers. The amount of monomer used in each subsequent step was estimated by the size of the initial block using gel permeation chromatography (GPC). This procedure was repeated for 2 and 4 block copolymers; in this case, 0.7 mmol of eBiB initiator was used instead of BBIB. The resulting number average mol. wt. ($M_n$), weight average mol. wt. ($M_w$), and dispersity (D) are listed in Table 5 wherein $M_n$, D, and $T_g$s for pMMA-b-pnBA block copolymers are presented. In Table 3 x and y represent molar ratios of MMA (M) and nBA (B) units in each block.

Analysis of Physical Properties

Analytical Methods

GPC was performed using Waters GPC calibrated with GPC grade polystyrene standards using the refractive index (RI) detector. The copolymers were dissolved in HPLC grade chloroform and passed through a 0.2µ filter prior to each measurement.

Differential scanning calorimetry (DSC) measurements were conducted in Q 100 series TA Instruments DSC. In a typical experiment, the heating of 20° C./min was used in the −70 to 150° C. range. Data analysis was performed in TA Universal Analysis software.

To determine self-repairing of p(MMA/nBA) copolymers, 0.3×1.0×0.025 cm films were cut using a stainless-steel razorblade which resulted in cuts 20 µm in width and ~30 µm in depth. These films were allowed to heal under ambient conditions at room temperature (RT) for 14 hrs. After that time, tensile stress-strain measurements were performed using Instron Model 5500R 1125. The same stress-strain measurements were also performed before damage. All measurements were conducted at a strain rate of 4 cm/min using a 2 kN load cell. The results of these experiments are shown in FIG. 1 (A5-D5) and FIG. 14B. High molecular weight copolymers were allowed to heal for ~86 hrs prior to analysis as illustrated in FIG. 5b. Self-healing experiments were repeated more than 10 times.

Dynamic mechanical analysis (DMA) was performed using a TA Instrument Q800 DMA in a strain control mode. In a typical experiment, each specimen was cut to 0.5×1.0× 0.025 cm. All experiments were repeated twice. The following conditions and parameters were used: the gauge length was set at 0.99-1.05 cm, analysis was performed using a 10 µm amplitude at 10 Hz frequency, and force track was set at 125%, at 2° C./min heating rate from −60 to 60° C.

TABLE 5

| MMA/nBA Molar Ratio* | Number of Blocks | Block Size ($A_XB_Y$) | $M_n$ (Da) | D | $T_{g_1}$ (K)(±1) | $T_{g_2}$ (K)(±1) |
|---|---|---|---|---|---|---|
| 51/49 | 2 | $A_{51}$-$B_{49}$ | 28201 | 1.67 | 226 | 368 |
| 64/36 | 2 | $A_{64}$-$B_{36}$ | 23466 | 1.48 | 233 | 390 |
| 62/38 | 3 | $A_{31}$-$B_{38}$-$A_{31}$ | 22095 | 1.99 | 227 | 368 |
| 36/64 | 3 | $B_{32}$-$A_{36}$-$B_{32}$ | 28385 | 1.76 | 228 | 369 |
| 51/49 | 4 | $A_{26}$-$B_{25}$-$A_{25}$-$B_{24}$ | 29219 | 1.60 | 217 | 372 |
| 45/55 | 5 | $B_{15}$-$A_{22.5}$-$B_{25}$-$A_{22.5}$-$B_{15}$ | 19869 | 2.08 | 222 | 371 |
| 56/44 | 5 | $A_{20}$-$B_{22}$-$A_{16}$-$B_{22}$-$A_{20}$ | 28176 | 1.80 | 227 | 368 |

*determined by $^1$H NMR

Self-Healing of High Mol. Wt. p(MMA/nBA) Copolymers

The Young modulus (E), maximum strain at break ($E_{max}$) and maximum stress at break ($\sigma_{break}$) before damage and 14 hrs after repair as a function of selected p(MMA/nBA), p(MMA/nPA), and p(MMA)/NA) copolymer compositions are presented in Table 6. The corresponding values for high molecular weight p(MMA/nBA) copolymers are presented in Table 10. Unless otherwise indicated (*), these data represents an average of five measurements.

TABLE 6

| Copolymer | E (MPa) | $\varepsilon_{max}$ (%) | $\varepsilon_{max}$ (14 hrs) (%) | $\sigma_{break}$ (MPa) | $\sigma_{break}$ (14 hrs) (MPa) |
|---|---|---|---|---|---|
| 40/60 p(MMA/nBA) | 2.5 | 808 ± 145 | 448 ± 41 | 1.1 ± 0.3 | 0.7 ± 0.1 |
| 45/55 p(MMA/nBA) | 79.9 | 661 ± 99 | 583 ± 50 | 10.4 ± 1.1 | 8.6 ± 1.3 |
| 50/50 p(MMA/nBA) | 73.3 | 341 ± 48 | 364 ± 28 | 6.5 ± 0.4 | 7.0 ± 0.2 |
| 55/45 p(MMA/nBA) | 269.1 | 84 ± 47 | 7.4 ± 18 | 3.6 ± 2.0 | 11.8 ± 3.4 |
| 40/60 p(MMA/nPA) | 8.7 | 848 ± 85 | 844 ± 36 | 1.4 ± 0.2 | 1.2 ± 0.3 |
| 50/50 p(MMA/nPA) | 97.5 | 660 ± 90 | 629 ± 15 | 11.6 ± 1.5 | 10.1 ± 0.2 |
| 60/40 p(MMA/nPA) | 141.2 | 610 ± 68 | 430 ± 50 | 11.2 ± 0.4 | 8.4 ± 0.3 |
| 40/60 p(MMA/HA) | 0.8 | 980 ± 92 | 830 ± 58 | 0.18 ± 0.7 | 0.14 ± .04 |
| 50/50 p(MMA/HA) | 9.7 | 639 ± 88 | 613 ± 130 | 1.9 ± 0.35 | 1.9 ± 0.9 |
| 60/40 p(MMA/HA) | 65.9 | 583 ± 30 | 346 ± 22 | 5.0 ± 0.7 | 3.5 ± 0.1 |

TABLE 7

| Copolymer | E (MPa) | $\varepsilon_{max}$ (%) | $\varepsilon_{max}$ (14hrs) (%) | $\sigma_{break}$ (MPa) | $\sigma_{break}$ (14 hrs) (MPa) |
|---|---|---|---|---|---|
| 45/55 p(MMA/nBA) | 46.5 | 582 ± 44 | 494 ± 38 | 6.4 ± 0.70 | 6.5 ± 0.15 |
| 50/50 p(MMA/nBA) | 52.6 | 517 ± 31 | 414 ± 20 | 7.4 ± 0.42 | 7.2 ± 0.2 |
| 55/45 p(MMA/nBA) | 123.5 | 502 ± 19.7 | 14 ± 8 | 7.2 ± 0.75 | 1.8 ± 0.1 |

Dynamic Mechanical Analysis (DMA)

The aforementioned experimental conditions were used to determine junction density (vi) values. The $v_j$ values for each copolymer were determined using the approach outlined below. In a typical DMA experiment, the following copolymer properties as a function of temperature, illustrated in FIG. 6, were obtained: storage modulus (E'), loss modulus (E''), not shown, tan δ (log(E'')/log(E')), and viscoelastic length transition (VLT). Using experimental VLT values for a single DMA measurement and rubber elasticity theory allows us to calculate the $v_j$ using the following relationship $$v_j = \frac{\sigma_R}{RT\left[\alpha - \frac{1}{\alpha^2}\right]};$$

where: $\sigma_R$ is the retractive stress and a is the elongation ratio (L/L$_0$) obtained from the DMA analysis. Using $$\Delta S = \frac{-Rv_j}{2}\left[\alpha^2 + \frac{2}{\alpha} - 3\right],$$

this approach also allows determination of stored entropy $\Delta S_s = -T_{\varepsilon max}S_{\varepsilon max} + T_i S_i$; where: $T_{\varepsilon max}$ and $S_{\varepsilon max}$ are temperature and entropy at max elongation ($\varepsilon_{max}$), and $T_i$ and $S_i$ are before elongation. These $\Delta S_s$ and $v_j$ are tabulated as a function of copolymer composition are provided in Table 8 wherein Junction density ($v_j$), entropy ($\Delta S_s$), and mol. wt. ($M_w$) as a function of p(MMA/nBA) copolymer composition are reported. The $v_j$ value for pnBA homopolymer is available in the literature.

TABLE 8

| MMA/nBA Molar Ratio | $v_j$ (mol/m$^3$) | $\Delta S_s$ (kJ/m$^3$) | $M_w$ (DA) × 10$^{-5}$ |
|---|---|---|---|
| 0/100 | 60* | — | — |
| 41/59 | 77.5 | 9.7 | 3.2 ± 0.4 |
| 43/57 | 97.4 | 13.2 | 7.6 ± 0.5 |
| 50/50 | 123.6 | 23.6 | 5.6 ± 0.6 |
| 55/45 | 96.5 | 14.7 | 3.2 ± 0.5 |
| 58/42 | 87.3 | 15.6 | 5.7 ± 0.6 |
| 65/35 | 61.1 | 9.9 | 1.5 ± 0.2 |
| 100/0 | 93.1 | 8.6 | 7.3 ± 1.9 |

*p(nBA) junction density was obtained from ref.

Spectroscopic Measurements

Fourier transform infrared (FT-IR) spectra were obtained using the Agilent Carry 680 μATR-FTIR single-beam spectrometer set at 4 cm$^{-1}$ resolution. Internal reflection infrared (IRIRI) images were obtained using the Agilent Carry 600 system equipped with internal reflection (IRIRI) accessory, enabling 1×1 μm spatial resolution. All spectra collected from undamaged, damaged and repaired areas were averaged using GRAMS software.

Solution $^1$H NMR measurements were performed on a 300 MHz JEOL Model ECX-300 spectrometer with a 2 sec relaxation delay. A standard concentration of 2.5 mg/ml of copolymer to chloroform-D was utilized. Unless otherwise specified, in a typical experiment 64 scans were collected; for example, for time-dependent analysis 32 scans was co-added. All spectra were processed using MestReNova software. $^1$H NMR spectra of undamaged and damaged copolymers were obtained in the following manner: p(MMA/nBA) copolymer films (5×5×1 mm) were cut into 30 equal parts, dissolved in chloroform-D at a concentration of 5 mg/ml, followed by $^1$H NMR analysis. It is important that solubilizing the films should be carried out without agitation.

Electron paramagnetic resonance (EPR) spectra were obtained using Bruker X-band spectrometer. The magnetic field was swept from 3000-3800 Gauss, while the microwave power and amplitude were 10 mW and 0.5 G, respectively. The modulation frequency used was 100 KHz and 200 scans were co-added for each spectrum. p(MMA/nBA) copolymer films (1×1×0.1 cm), as well as their respective blends of 1000 kDA pMMA and 5000 kDA pnBA, were cut on a stainless-steel grooved panel into 50 identical pieces under a N$_2$ environment and dissolved in CDCl$_3$ (50 mg/ml). Each cut specimen was dissolved for 20 minutes prior to analysis in order to obtain a more homogeneous radical environment. As a control no radicals were detected in pMMA (1000 kDA) and pnBA (5000 kDA) homopolymers as well as pure CDCl$_3$. To obtain free radical concentration, α,γ-bisdiphenylene-β-phenylallyl (BDPA) standard with a known radical concentration of 2.0×10$^{-3}$ mol/L was utilized. Using MestReNova software the radical concentration levels were determined and compared to the number of scans as well as the signal-to-noise ratio of the BDPA standard.

$^1$H NMR Analysis of pMMA-b-pnBA Block Copolymers

Figure 7:
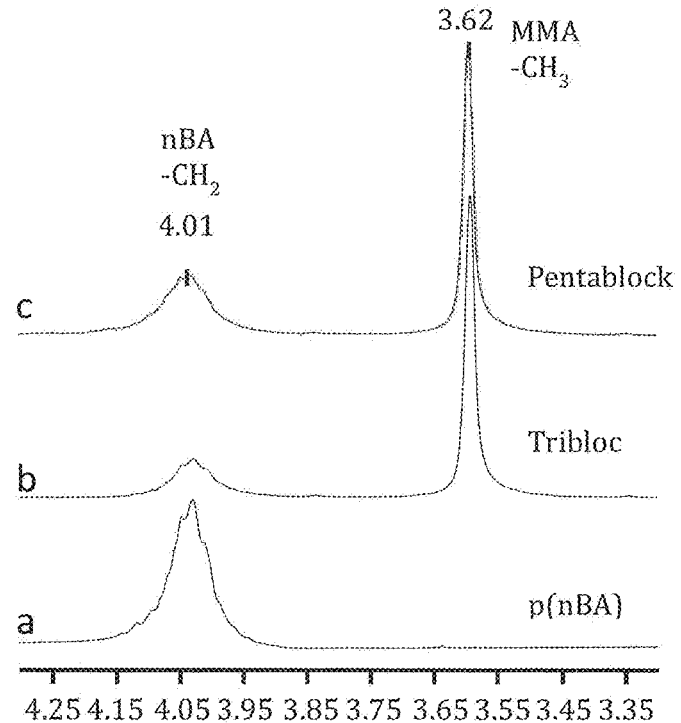
FIG. 7 graphically illustrates the $^1$H NMR spectra of p(nBA) homopolymer (a), triblock pMMA-b-pnBA ($M_{22.5}$-$B_{25}$-$M_{22.5}$) (b), and penta-block pMMA-b-pnBA ($B_{15}$-$M_{22.5}$-$B_{25}$-$M_{22.5}$-$B_{15}$) (c) copolymers (M—methyl methacrylate; B—n-butyl acrylate).

FIG. 7 shows an example of $^1$H NMR analysis of block copolymers synthesized using ATRP. Copolymer compositions were determined by measuring the resonance intensities of nBA —OCH$_2$— and MMA —OCH$_3$ at 4.01 and 3.62 ppm, respectively.

FT-IR Spectroscopic Analysis.

Figure 8:
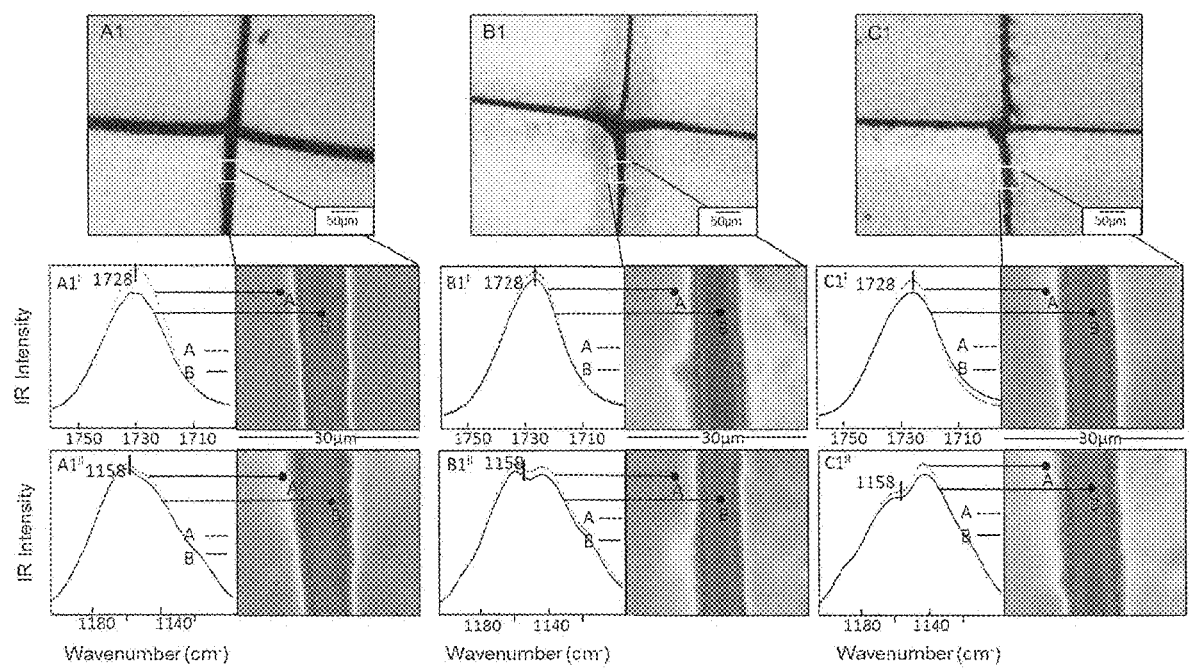
FIG. 8 provides optical images (A1-C1) and IRIRI ($A1^I$/$A1^{II}$-$C1^I$/$C1^{II}$) images of 45/55 (A series), 50/50 (B series) and 55/45 (C series) p(MMA/nBA) copolymers recorded immediately after damage and the IRIR images represent distribution of the 1728 cm$^{-1}$ band due to C=O vibrations ($A^I$-$C^I$) and the 1158 cm$^{-1}$ band due to C—O—C vibrations ($A1^{II}$-$C1^{II}$) recorded from areas A and B.

FIG. 8, A1$^I$-C1$^I$ and A1$^{II}$-C1$^{II}$ illustrate IR images of the 1728 (A1$^I$-C1$^I$) and 1158 (A1$^{II}$-C1$^{II}$) cm$^{-1}$ bands recorded from the square areas in FIG. 8, A1-C1. The corresponding IR spectra were collected from undamaged (A) and damaged (B) areas and were normalized at the C—H band (2950 cm$^{-1}$). As seen, C=O (1728 cm$^{-1}$) and C—O—C (1158 cm$^{-1}$) intensities attributed to the MMA and nBA side groups decrease upon mechanical damage. However, they return to their original intensities upon self-repair, suggesting reversible conformational changes, which are not observed for non-self-healing p(MMA/nBA) alternating/random compositions as well as for block pMMA-b-pnBA copolymers. Notably, no bond cleavage was detected, which is likely attributed to low concentration levels of cleaved bonds or no bond cleavage.

Figure 9:
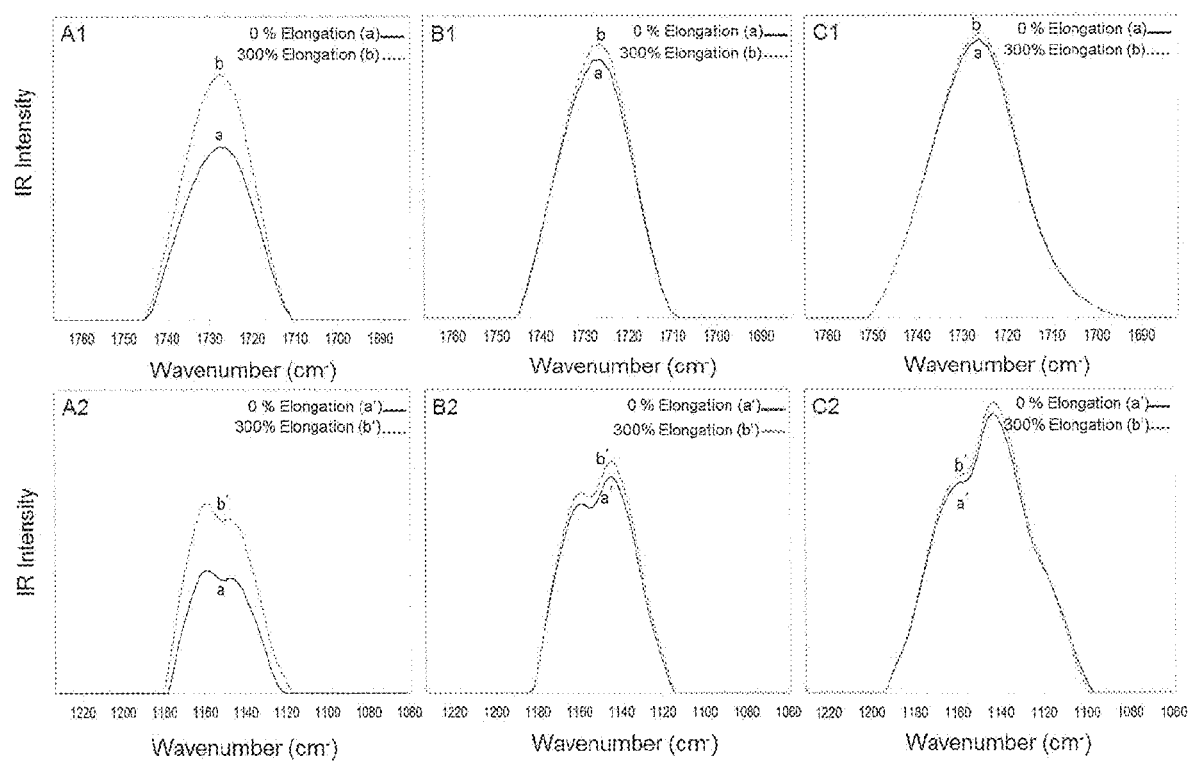
FIG. 9 graphically illustrates IR spectra of 45/55 (A1-A2), 50/50 (B1-B2) and 55/45 (C1-C2) copolymers at 1728 (A1-C1) and 1158(A2-C2) cm$^{-1}$ bands recorded before (a/a′) and after (b/b′) 300% elongation.

To examine conformational changes in response to self-repairing behavior within 45/55-55/45 MMA/nBA molar ratio range, p(MMA/nBA) films were elongated to 300% and IR spectra were recorded using μATR-FTIR. These experiments showed that the band intensities at 1758 and 1158 cm$^{-1}$ increase as illustrated in FIG. 9, indicating that the polymer chain orientation changes, likely due to directional alignment resulting from elongation. In separate experiments, the surfaces of p(MMA/nBA) copolymers with 45/55, 50/50, and 55/45 MMA/nBA monomer molar compositions were mechanically damaged, and FT-IR analysis revealed that the intensities of the same bands decrease. As shown in FIG. 8, A1/B1, upon mechanical damage the respective vibrational decrease, but upon repair, they return to their original intensities While a uniaxial elongation of p(MMA/nBA) copolymer films resulted in an increase of the aforementioned intensities due to chain alignment and an overall gauche-trans (gt) transition, as seen in FIG. 9, mechanical damage results in their decrease due to chain randomization observed in FIG. 8.

$^1$H NMR Self-Healing Analysis

Figure 10:
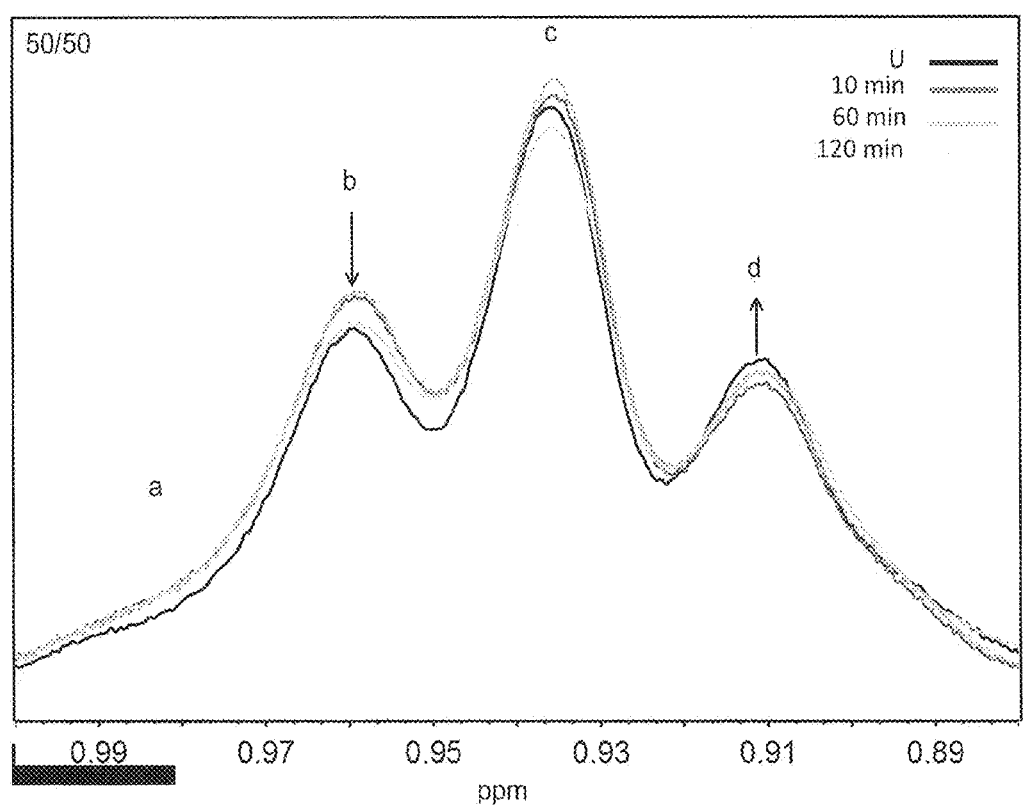
FIG. 10 graphically illustrates $^1$H NMR spectra of 50:50 p(MM/nBA) copolymer solutions before (U) and after damage at time intervals of 10 min, 60 min, and 120 min.

To determine molecular changes attributed to mechanical damage, $^1$H NMR spectra were recorded on undamaged (U) and damaged (D) copolymer films. The sample preparation and $^1$H NMR analysis. Table 9 summarizes the origin of the $^1$H NMR resonances of p(MMA/nBA) copolymers as well as pMMA and pnBA homopolymers. FIG. 11 illustrates $^1$H NMR spectra of 35:65 (6A), 45:55 (6B), and 65:35 (6C) molar ratios for undamaged (U) and after (D) damaged copolymers in the —CH$_3$ region. The corresponding resonances are sensitive to the damage-repair cycle at 0.98 ppm (a), 0.96 ppm (b), 0.93 ppm (c) and 0.90 ppm (d). Other resonances that are attributed to tacticity of p(MMA/nBA), pMMA and pnBA as shown in Table 9 wherein $^1$H NMR chemical shifts and their assignments for 45/55 p(MMA/nBA) copolymer, as well as pnBA and pMMA homopolymers are reported. While resonances labeled mm, mr, and rr are attributed to isotactic, atactic and syndiotactic —CH$_3$ (α-methyl) groups and show no sensitivity to the U-D process, significant intensity changes are detected for self-healing 45/55 copolymer composition shown in FIG. 11B. As shown, resonances a and b increase, while b and c decrease. These intensity changes and slight resonance shifts are attributed to deshielding of protons upon mechanical damage resulting from enhanced α-methyl-methyl interactions between MMA and nBA units within the same or neighboring copolymer chains. Initially vdW forces are present (U) and facilitate inter-chain interactions. Upon damage, the increase of a+b and decrease of c+d results from the exchange of shielded to deshielded —CH$_3$ protons due to conformational changes of methyl groups. These conformational changes are time dependent, as shown in $^1$H NMR experiments conducted as a function of time. For 45/55 and 50/50 copolymers, spectroscopic changes were monitored for 2 h as shown in FIG. 10. As seen, progressive return of their resonance intensities to the undamaged state positions is detected. However, all copolymers outside of the 45/55-50/50 p(MMA/nBA) range exhibit no detectable intensity changes as a function of time.

TABLE 9

| Polymer | Resonance (ppm) | Position | Assignment* |
|---|---|---|---|
| p(MMA/nB) | | | |
| | 0.98 | a | —$CH_3$ (in MMA/nBA) |
| | 0.96 | b | —$CH_3$ (in MMA/nBA) |
| | 0.93 | c | —$CH_3$ (in MMA/nBA) |
| | 0.90 | d | —$CH_3$ (in MMA/nBA) |
| | 1.12, 1.25 | e | mm —$CH_3$** |
| | 1.04 | f | mr —$CH_3$** |
| | 0.84 | g | rr —$CH_3$** |
| | 1.33-1.39 | h | —$CH_2$— (nBA Side group) |
| | 1.59 | i | Backbone —$CH_2$— |
| | 1.62 | j | —$CH_2$— (nBA Side group) |
| | 2.30 | k | Backbone —CH— |
| | 3.62 | m | —$OCH_3$ in MMA |
| | 4.01 | n | —$OCH_2$— in nBA |
| pMMA | | | |
| | 3.58 | m | —$OCH_3$ in MMA |
| | 2.02-1.81; 1.57-1.54 | l | Backbone —$CH_2$— |
| | 1.21, 1.25 | e' | mm —$CH_3$ |
| | 1.02 | f' | mr —$CH_3$ |
| | 0.84 | g' | rr —$CH_3$ |
| pnBA | | | |
| | 4.01 | N | —$OCH_2$— in nBA |
| | 0.95 | b' | —$CH_3$ (nBA Side group) |
| | 0.93 | c' | —$CH_3$ (nBA Side group) |
| | 0.91 | d' | —$CH_3$ (nBA Side group) |
| | 1.33-1.40 | h' | —$CH_2$ (nBA Side group) |
| | 1.59 | i' | Backbone —$CH_2$— |
| | 1.65 | j' | —$CH_2$ (nBA Side grooup)- |
| | 2.30 | k' | Backbone —CH— |

*$^1$H NMR spectra assignments for these polymers are available in literature
**concentrations of mm, mr and rr are too low to detect.

$^1$H NMR Copolymer Topology Determination

The values of reactivity ratios for MMA ($r_1$) and nBA ($r_2$) monomers vary in the literature, depending upon experimental conditions ($r_1$=1.75-3.15 and $r_2$=0.2-0.39). Regardless of the accuracy of these measurements, these values favor the formation of gradient topologies with higher MMA content at the initial stages of copolymerization and become more randomly distributed as polymerization continues. To determine monomer distribution of MMA and nBA units, $^1$H NMR analysis was utilized. FIG. 12A shows representative $^1$H NMR spectra of 30/70 (Trace A), 45/55 (Trace B) and 70/30 (Trace C) copolymers in the 1.29-0.79 ppm region corresponding to the α-$CH_3$ protons of MMA and nBA —$CH_3$ side groups. The MMA α-$CH_3$ proton resonances in this region are sensitive to tacticity changes and the presence of neighboring repeating units, whereas nBA —$CH_3$ protons are not. Table 11 summarizes the resonances in this region and their associated structural features. Similar to MMA triads (MMM) in homopolymers, the resonances due to MMM triads in alternating/random copolymers are detected at 1.25, 1.12, 1.04 and 0.84 ppm, which correspond to isotactic (mm), atactic (mr), and syndiotactic triads (rr), respectively. While FIG. 12A clearly shows the intensity increase of these peaks as MMA monomer content increases, Table 12 provides the percentage of α-$CH_3$ protons that belong to MMA triads ([1]$H_{mm,mr,rr}$ %) as a function of monomer feed (f) and the actual monomer (F) ratios obtained from $^1$H NMR analysis. As expected, these values increase as the MMA content increases, and for self-healing compositions (45/55-50/50), [1]$H_{mm,mr,rr}$ % ranges from 15.0 to 16.1%. The presence of MMA triads indicates that some block-like distributions may be present, but the overall copolymer topology is predominately alternating/random. In comparison, 70/30 p(MMA/nBA) copolymers are dominated by block topologies indicated by ~41.0% of —$CH_3$ protons that belong to MMA isotactic triads of pMMA sequences. Table 11 provides $^1$H NMR chemical shifts, assignment, tacticity, and integrated areas of resonances used to determine copolymer topologies.

FIG. 12B illustrates enlarged $^1$H NMR spectra of p(MMMA) (A), p(MMA)-b-p(nBA) (B), and p(MMA/nBA) (45/55) (C). As shown, going from pMMA homopolymer to pMMA-b-nBA block copolymer, the resonance at 1.21 ppm due to α-CH$_3$ of isotactic MMM triads decrease within an isotactic block. When MMA is copolymerized with nBA this resonance is very weak, indicating that either MMA units favors alternating/random distribution of MMA and nBA units along the copolymer backbone and is less likely to form isotactic blocks, or that the tacticity of MMA blocks has changed from isotactic to atactic/syndiotactic. There is no evidence though that nBA monomer should influence tacticity changes. In Table 12 MMA/nBA molar feed ratios (f), actual MMA/nBA ratios (F), and the corresponding % of MMA triads in the copolymer ($^1$H$_{mm,mr,rr}$ %) are shown. Table 10 provides the MD simulations for block copolymers with a variable block sizes ranging from 12 to 30 repeating units next to each other. Table 13 provides cohesive energy density of equilibrated (CED$_{eq}$), van der Waals (vdW) density, end-to-end distances (r$_{eq}$), flexibility parameters (f$_{eq}$), and enthalpy changes (ΔH$_{eq}$) as a function of MMA/nBA molar ratios (boxed rows indicate self-healing (Range II of FIG. 2) using reactivity ratios r$_1$=2.61 and r$_2$=0.36.

TABLE 10

| MMA/nBA Molar Ratio | Number of Blocks | CED$_b$ (J/m$^3$ × 10$^8$) | Block Size (A$_X$B$_Y$) | Avg. Block Size |
|---|---|---|---|---|
| 51/49 | 2 | 1.52 | A$_{51}$-B$_{49}$ | 30 |
| 64/36 | 2 | 1.70 | A$_{64}$-B$_{36}$ | 30 |
| 62/38 | 3 | 1.67 | A$_{31}$-B$_{38}$-A$_{31}$ | 20 |
| 36/64 | 3 | 1.63 | B$_{32}$-A$_{36}$-B$_{32}$ | 20 |
| 51/49 | 4 | 1.64 | A$_{26}$-B$_{25}$-A$_{25}$-B$_{24}$ | 15 |
| 45/55 | 5 | 1.62 | B$_{15}$-A$_{22.5}$-B$_{25}$-A$_{22.5}$-B$_{15}$ | 12 |
| 56/44 | 5 | 1.69 | A$_{20}$-B$_{22}$-A-$_{16}$-B$_{22}$-A$_{20}$ | 12 |
| 50/50 | 7 | 2.10 | A$_{11.5}$-B$_{17}$-A$_{13}$-B$_{17}$-A$_{13}$-B$_{17}$-A$_{11.5}$ | 9-10 |

TABLE 11

| Chemical Shift (ppm) | Assignment | Tacticity | Integrated Area |
|---|---|---|---|
| 4.01 | —OCH$_2$— of nBA | — | I$_{4.01}$ |
| 3.62 | —OCH$_3$ of MMA | — | I$_{3.62}$ |
| 1.25 | α-CH$_3$ of MMA triads | isotactic (mm) | I$_{1.25}$ |
| 1.12 | α-CH$_3$ of MMA triads | isotactic (mm) | I$_{1.12}$ |
| 1.04 | α-CH$_3$ of MMA triads | atactic (mr) | I$_{1.04}$ |
| 0.98-0.89 | α-CH$_3$ of MMA dyads and monads overlapped with —CH$_3$ of nBA | — | I$_{0.98-0.89}$ |
| 0.84 | α-CH$_3$ of MMA triads | syndiotactic (mr) | I$_{0.84}$ |

TABLE 12

| MMA/nBA Molar Feed Ratio (f) | Actual MMA/nBA Molar Ratio (F)$^a$ | $^1$H$_{mm,mr,rr}$ %$^b$ |
|---|---|---|
| 30/70 | 28/72 | 4.2 |
| 40/60 | 36/64 | 13.5 |
| 45/55 | 45/55 | 16.1 |
| 50/50 | 51/49 | 15.0 |
| 55/45 | 57/43 | 22.1 |
| 60/40 | 61/39 | 32.5 |
| 70/30 | 68/32 | 41.0 |

In Table 12 a Molar fraction of nBA (F$_{nBA}$) in copolymers was determined by integrating the resonances of nBA —OCH$_2$— and MMA —OCH$_3$ protons: F$_{nBA}$=(I$_{4.01}$/2)/(I$_{4.01}$/2+I$_{3.62}$/3). The molar fraction of MMA F$_{MMA}$=1-F$_{nBA}$. $^b$ $^1$H$_{mm,mr,rr}$ % was calculated using equation $^1$H$_{mm,mr,rr}$ %=100×(I$_{1.25}$+I$_{1.12}$+I$_{1.04}$+I$_{0.84}$)/(I$_{1.25}$+I$_{1.12}$+I$_{1.04}$+I$_{0.84}$+I$_{0.98-0.89}$)

To examine the role of the reactivity ratios on the CED$_{eq}$ values, MD simulations were conducted using MMA and nBA reactivity ratios of r$_1$=2.61 and r$_2$=0.36. Table 13 summarizes CED$_{eq}$, vdW$_{eq}$ densities, r$_{eq}$, f$_{eq}$, and ΔH$_{eq}$ values and show that although the numerical values are different, similar trends to those observed in FIG. 2A (r$_1$=r$_2$=1) are obtained. In contrast, the same MD simulations for block copolymers with a variable block sizes ranging from 12 to 30 repeating units next to each other show similar CED values (1.7-1.52) for 45/55-50/50 compositional range of Table 10. Again, these data further support the formation of alternating/random topologies in the self-healing region.

TABLE 13

| MMA/nBA Molar Ratio | CED$_{eq}$ ± 0.05 (10$^5$ kJ/m$^3$) | vdW$_{eq}$ density ± 0.05 (10$^5$ kJ/m$^3$) | r$_{eq}$ ± 0.2 (Å) | f$_{eq}$ ± 0.01 | ΔH$_{eq}$ ± 0.08 (10$^3$ kJ/mol) |
|---|---|---|---|---|---|
| 100/0 | 1.95 | 1.87 | 27.7 | 0.696 | −6.64 |
| 70/30 | 1.48 | 1.68 | 22.3 | 0.903 | −7.40 |
| 55/45 | 1.69 | 1.45 | 29.9 | 0.628 | −6.14 |
| 50/50 | 2.17 | 2.06 | 35.0 | 0.501 | −8.75 |
| 45/55 | 1.98 | 1.88 | 31.0 | 0.597 | −8.15 |
| 40/60 | 1.51 | 1.61 | 27.1 | 0.716 | −6.73 |
| 30/70 | 1.74 | 1.32 | 26.1 | 0.751 | −5.12 |
| 0/100 | 1.67 | 1.49 | 25.9 | 0.758 | −7.93 |

Due to the statistical nature of copolymeriztion it is also useful to determine the probability of finding triads as a function of copolymer composition for $r_1=2.61$ and $r_2=0.36$. Table 14 summarizes these values, which were determined form MD simulations and shows that the probability of finding MBM+BMB are slightly greater for self-healing compositions (~1%). These values further indicate that the reactivity ratios do not significantly favor the formation of blocks in the 40/60-60/40 MMA/nBA molar range. In Table 14 the probabilities of finding various MMA triads in pMMA/nBA copolymers of various compositions for reactivity ratios $r_1=2.61$ and $r_2=0.36$ are reported.

TABLE 14

| Triads | 30/70 | 40/60 | 45/55 | 50/50 | 55/45 | 60/40 | 70/30 |
|---|---|---|---|---|---|---|---|
| MMM | 0.027 | 0.062 | 0.088 | 0.123 | 0.163 | 0.213 | 0.334 |
| MMB | 0.064 | 0.096 | 0.111 | 0.125 | 0.137 | 0.145 | 0.148 |
| MBM | 0.067 | 0.099 | 0.115 | 0.128 | 0.141 | 0.148 | 0.151 |
| MBB | 0.149 | 0.145 | 0.137 | 0.125 | 0.111 | 0.095 | 0.063 |
| BMM | 0.064 | 0.096 | 0.111 | 0.125 | 0.137 | 0.145 | 0.148 |
| BMB | 0.151 | 0.148 | 0.140 | 0.128 | 0.115 | 0.099 | 0.066 |
| BBM | 0.149 | 0.145 | 0.136 | 0.125 | 0.111 | 0.095 | 0.063 |
| BBB | 0.328 | 0.212 | 0.162 | 0.121 | 0.087 | 0.061 | 0.026 |
| Σ(BMB, MBM) | 0.218 | 0.247 | 0.255 | 0.256 | 0.256 | 0.247 | 0.217 |
| Σ(BBB, MMM) | 0.355 | 0.274 | 0.250 | 0.244 | 0.250 | 0.274 | 0.360 |

ESR Analysis

Since mechanical damage may also lead to the formation of free radicals, electron spin resonance (ESR) analysis was utilized to monitor their potential formation. If formed, damage induced free radicals would originate from the rupture of a copolymer backbone, and their location on the —CH, —CH$_2$ and —CH$_3$ carbons would be expected. p(MMA/nBA) copolymers, homopolymers, and their blends were damaged using a stage-cutting device specially designed for that purpose. Each copolymer film (1×1×0.1 cm) was cut into 50 identical pieces under a N$_2$ environment and dissolved in CDCl$_3$ (50 mg/ml). The number of cuts and sample was increased from previous experiments in order to maximize the concentration levels of possible free radicals. To identify the presence of free radicals ESR spectra of damaged copolymers, homopolymers and pure CDCl$_3$ were collected and are shown in FIG. 13. Raw ESR data were imported into MestReNova software and smoothed using the Whittaker Smoother. The region in which these radicals occur ranges from 3250-3450 Gauss, which agrees with the literature values for pure pMMA and pnBA copolymers. These experiments revealed that upon mechanical damage free radical concentration range from $4.5-8.5\times10^{-7}$ mol/L, which are low compared to expected levels during polymerization, γ-radiation, or laser irradiation ($0.1\times10^{-5}$ to $1.0\times10^{-5}$ mol/L). ESR spectra of undamaged specimens could not be recorded because no detectable unpaired electrons exist in the undamaged state. Low concentration levels and no compositional dependence for damaged films did not allow for the determination of the role of free radicals in the self-healing process.

Molecular Dynamic (MD) Simulations

MD Methodology

Molecular dynamic simulations were performed using Materials Studio v5.5 software (Accelrys Inc.). Amorphous cells of MMA and nBA homopolymers, block polymers, as well as the random copolymers with molar ratios matching to the synthetic copolymer compositions were utilized in each simulation. Table 1 provides equilibrium cohesive energy density (CED$_{eq}$), end-to-end distances (r$_{eq}$), and vdW$_{eq}$ density values. Each copolymer system was designed using amorphous cell module and COMPASS force field and all simulations were repeated twice.

MD Simulations of MMA/nBA Chains

For each MMA/nBA composition, seven identical p(MMA/nBA) copolymer chains (60 monomer units each) were placed inside a unit cell at a density of 1.125 g/cm$^3$. The pMMA and pnBA homopolymer cell densities were 1.17 g/cm$^3$ and 1.087 g/cm$^3$, respectively. Prior to equilibration, copolymers in each unit cell were geometrically optimized using 1000 iterations. Upon completion, each cell was allowed to equilibrate for 20 psec (NVT, isothermal at 298K, at a time-step of 0.33 fsec, Velocity Scale thermostat), to obtain primary values of minimized energies. The unit cells were equilibrated further under the same conditions but using the Berendsen thermostat. At this point the NVE equilibration (20 psec, at a time step of 0.25 fsec) was conducted until equilibrium was reached, reflected by no further energy changes. The end-to-end distances (r$_{eq}$) as well as CED$_{eq}$ were calculated using the Forcite cohesive energy density module (Table 1). The COMPASS force field was utilized in all MD simulations.

MD Simulations of Extended-Helical State MMA/nBA Chains

For each MMA/nBA composition, seven identical p(MMA/nBA) copolymer chains (60 monomer units each) at a fixed end-to-end distance (r$_{hl}$) of 34.3 Å, corresponding to an extended-helical topology, were placed inside a unit cell at a density of 1.125 g/cm$^3$. The pMMA and pnBA homopolymer cell densities were 1.17 g/cm$^3$ and 1.087 g/cm$^3$, respectively. Prior to equilibration, the unit cells were geometrically optimized using 1000 iterations. Upon optimization, the unit cells were equilibrated for 60 psec (NVT, isothermal at 298 K, at a time step of 0.33 fsec, Berendsen thermostat. When equilibration was reached, the end-to-end distances (r$_{hl}$) as well as CED$_{hl}$ were determined using the Forcite cohesive energy density module. The same procedures were utilized for block pMMA-b-pnBA, p(MMA/nPA) and p(MMA/HA) copolymers.

Pentad simulations were performed using the NPT (0 GPa) and NVT ensembles for 40 ps, at 298° K. Each simulated pentad unit cell consisted of 6 pentad units. Using the time step of 0.33 fs/step the NPT simulation allowed us to determined equilibrium densities of the pentads. These values were utilized to create a new pentad cell, which was then subjected to the NVT MD simulation with the aforementioned parameters.

Density Changes as a Function of Monomer Ratio.

Figure 14:
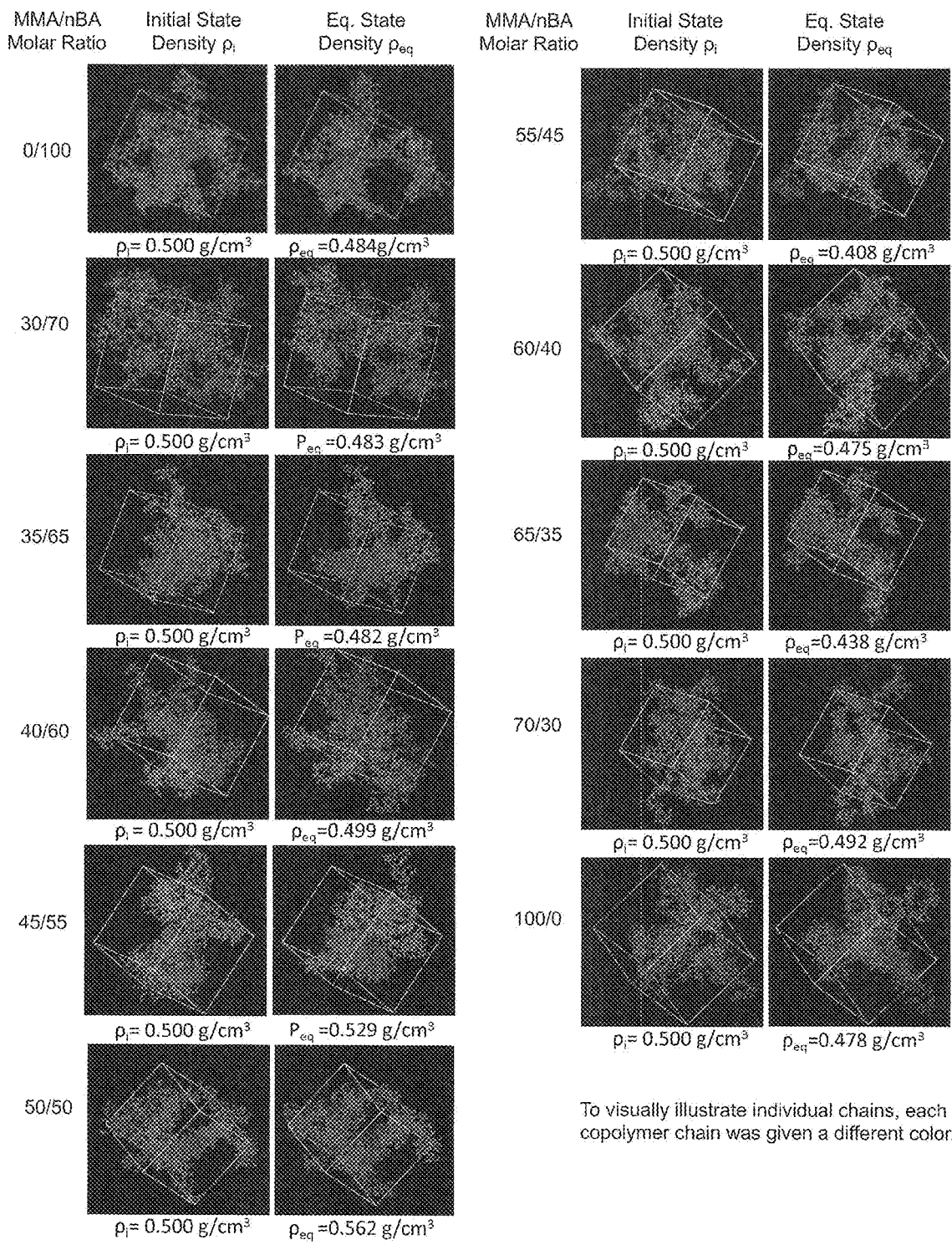
FIG. 14 optically illustrates local density changes ($\rho_i$ to $\rho_{eq}$) of pMMA/nBA copolymers as a function of copolymer composition from the initial state at $\rho_i$=0.500 g/cm$^3$ to an optimum energy state ($\rho_{eq}$—equilibrium) after isothermal (NVT) equilibration at 298 K. For 50/50 and 45/55 copolymer MMA/nBA molar ratios, the density increase is observed.

For each MMA/nBA composition, seven identical p(MMA/nBA) copolymer chains (60 monomer units each) were placed inside a unit cell and the initial density of the chains inside the cell was 0.5 g/cm$^3$. However, depending upon copolymer composition, several macromolecular segments were partially located outside the cell. The ultimate goal of this simulation was to determine how many segments moved outside or inside the cell upon reaching equilibrium. Upon setting up the unit cell optimization conditions (geometric optimization at 1000 steps, NVT, isothermal at 298 K at a time-step of 0.33 fsec for 80 psec) each cell was initially allowed to equilibrate for ~6 psec. At that time, local kinetic and potential energy minima were reached with the cell density 0.5 g/cm$^3$; however, the chains were still in a non-equilibrium state. After ~50-60 psecs, each cell reached an equilibrium state that reflected in no further energy changes, but the number of macromolecular segments inside the cell had changed. Consequently, the density of the cell had changed. To ensure that the cell was fully equilibrated, simulations were extended up to 80 psecs, at which point the final density changes were recorded. These results are illustrated in FIG. 14.

p(MMA/nBA) Copolymers

Table 1 summarizes the $CED_{eq}$, $r_{eq}$, and $vdW_{eq}$ density for p(MMA/nBA) copolymers. As copolymer compositions approach self-healing (Range II), these values increase. As expected, the $\Delta H_{eq}$ values decrease. The following relationship, $CED_{eq} = ((\Delta H_{eq} - RT)/V_m)$ where: R is the gas constant, T is temperature, and $V_m$ is the molar volume), was used to determine $\Delta H_{eq}$ (defined as the enthalpy of vaporization at equilibrium).

To examine the influence of the reactivity ratios on the $CED_{eq}$ values, MD simulations were conducted using MMA and nBA reactivity ratios of $r_1=2.61$ and $r_2=0.36$. Table 15 summarizes $CED_{eq}$, $vdW_{eq}$ densities, $r_{eq}$, $f_{eq}$, and $\Delta H_{eq}$ values and show that although the numerical values are different, similar trends to those observed in FIG. 2A ($r_1=r_2=1$) are obtained. In Table 15 the cohesive energy density of equilibrated ($CED_{eq}$), van der Waals (vdW) density, end-to-end distances ($r_{eq}$), flexibility parameters ($f_{eq}$), and enthalpy changes ($\Delta H_{eq}$) as a function of MMA/nBA molar ratios (boxed rows indicate self-healing (Range II of FIG. 2) for reactivity ratios $r_1=2.61$ and $r_2=0.36$ are reported. Table 16 provides the calculated probabilities of finding various MMA triads in pMMA/nBA copolymers of various compositions for reactivity ratios $r_1=2.61$ and $r_2=0.36$. In contrast, the same MD simulations for block copolymers with variable block sizes ranging from 12 to 30 repeating units next to each other show similar CED values (1.7-1.52) for 45/55-50/50 compositional range reported in Table 10. Again, these data further support the formation of alternating/random topologies in the self-healing region.

TABLE 15

| MMA/nBA Molar Ratio | $CED_{eq} \pm 0.05$ ($10^5$ kJ/m$^3$) | $vdW_{eq}$ density $\pm 0.05$ ($10^5$ kJ/m$^3$) | $r_{eq} \pm 0.2$ (Å) | $f_{eq} \pm 0.01$ | $\Delta H_{eq} \pm 0.08$ ($10^3$ kJ/mol) |
|---|---|---|---|---|---|
| 100/0  | 1.95 | 1.87 | 27.7 | 0.696 | −6.64 |
| 70/30  | 1.48 | 1.68 | 22.3 | 0.903 | −7.40 |
| 55/45  | 1.69 | 1.45 | 29.9 | 0.628 | −6.14 |
| 50/50  | 2.17 | 2.06 | 35.0 | 0.501 | −8.75 |
| 45/55  | 1.98 | 1.88 | 31.0 | 0.597 | −8.15 |
| 40/60  | 1.51 | 1.61 | 27.1 | 0.716 | −6.73 |
| 30/70  | 1.74 | 1.32 | 26.1 | 0.751 | −5.12 |
| 0/100  | 1.67 | 1.49 | 25.9 | 0.758 | −7.93 |

Due to the statistical nature of copolymerization, it is also useful to determine the probability of finding triads as a function of copolymer composition for $r_1=2.61$ and $r_2=0.36$. Table 14 summarizes these values, which were determined from MD simulations and shows that the probability of finding MBM+BMB is slightly greater for self-healing compositions (~1%). These values further indicate that the reactivity ratios do not significantly favor the formation of blocks in the 40/60-60/40 MMA/nBA molar range.

TABLE 16

| Triads | 30/70 | 40/60 | 45/55 | 50/50 | 55/45 | 60/40 | 70/30 |
|---|---|---|---|---|---|---|---|
| MMM | 0.027 | 0.062 | 0.088 | 0.123 | 0.163 | 0.213 | 0.334 |
| MMB | 0.064 | 0.096 | 0.111 | 0.125 | 0.137 | 0.145 | 0.148 |
| MBM | 0.067 | 0.099 | 0.115 | 0.128 | 0.141 | 0.148 | 0.151 |
| MBB | 0.149 | 0.145 | 0.137 | 0.125 | 0.111 | 0.095 | 0.063 |
| BMM | 0.064 | 0.096 | 0.111 | 0.125 | 0.137 | 0.145 | 0.148 |
| BMB | 0.151 | 0.148 | 0.140 | 0.128 | 0.115 | 0.099 | 0.066 |
| BBM | 0.149 | 0.145 | 0.136 | 0.125 | 0.111 | 0.095 | 0.063 |
| BBB | 0.328 | 0.212 | 0.162 | 0.121 | 0.087 | 0.061 | 0.026 |
| Σ(BMB, MBM) | 0.218 | 0.247 | 0.255 | 0.256 | 0.256 | 0.247 | 0.217 |
| Σ(BBB, MMM) | 0.355 | 0.274 | 0.250 | 0.244 | 0.250 | 0.274 | 0.360 | pMMA-b-pnBA Block Copolymers

The results of simulations for pMMA-b-pnBA copolymers are illustrated in Table 17. In Table 17 $CED_b$ values of pMMA-b-pnBA copolymers with the variable block size and number of blocks. $M_x$ and $B_y$ represent the MMA/nBA molar ratios are provided. Notably these copolymers do not exhibit enhanced $CED_{eq}$ values, as previously seen for p(MMA/nBA) copolymers within the self-repairing Range II.

TABLE 17

| MMA/nBA Molar Ratio | Number of Blocks | $CED_b$ ($10^5$ kJ/m$^3$) | Block Size ($M_xB_y$) | Avg. Block Size |
|---|---|---|---|---|
| 51/49 | 2 | 1.52 | $M_{51}$-$B_{49}$ | 30 |
| 64/36 | 2 | 1.70 | $M_{64}$-$B_{36}$ | 30 |

TABLE 17-continued

| MMA/nBA Molar Ratio | Number of Blocks | $CED_b$ ($10^5$ kJ/m$^3$) | Block Size ($M_XB_Y$) | Avg. Block Size |
|---|---|---|---|---|
| 62/38 | 3 | 1.67 | $M_{31}$-$B_{38}$-$M_{31}$ | 20 |
| 36/64 | 3 | 1.63 | $B_{32}$-$M_{36}$-$B_{32}$ | 20 |
| 51/49 | 4 | 1.64 | $M_{26}$-$B_{25}$-$M_{25}$-$B_{24}$ | 15 |
| 45/55 | 5 | 1.62 | $B_{15}$-$M_{22.5}$-$B_{25}$-$M_{22.5}$-$B_{15}$ | 12 |
| 56/44 | 5 | 1.69 | $M_{20}$-$B_{22}$-$M_{16}$-$B_{22}$-$M_{20}$ | 12 |

Density Determination

As seen in FIG. 14, assuming a density of 0.5 g/cm$^3$ when p(MMA/nBA) chains are allowed to isothermally equilibrate at 298 K with an access of free volume, density changes are observed. Upon equilibration, the chains within the self-repairing Range II form inter-mixed domains and their local density increases. On the contrary, the chains in Ranges I and III further separate, and their density decreases. These observations indicate that at 298 K, self-repairing p(MMA/nBA) copolymer compositions return to energetically favorable higher density states.

Pentad Simulations

In order to determine the role of monomer distribution on the increase of CED and on self-repair, we conducted NPT and NVT simulations on varying MMA/nBA pentads. In a typical expriment, six identical pentads were loaded into a unit cell at 0 GPa., and a density of 1.17 g/cm$^3$; they were allowed to reach optimum packing density via NPT quilibration for 40 ps. At this point the pentads were loaded into a unit cell at their newly calculated equilibrium densities, and were allowed to isothermally equilibrate for 40 ps (NVT). This time was sufficient to obtain average $CE_p$ values for each pentad interaction. As seen in Table 18 column A, the pentads containing nBA-MMA-nBA (BMB) triads show $CE_p$ values which are 10-26% higher compared to less alternationg, such as BBM or MMB. Similar trends were observed for M/P and M/H pentads, as seen in Table 18 column B and 18 column C. Notably, cohesive energy densities of the pentads ($CED_P$) reflect the aformentioned values, as higher $CE_p$ for pentads with equivalent number of methacrylate/acrylate units lead to higher $CED_P$. Table 18 provides cohesive energies ($CE_p$) and cohesive energy densities ($CED_p$) for the same pentads of: (A) MB, (B) MP, and (C) MH combinations (where: M—methyl methacrylate and B, P, and H are n-butyl acrylate, n-pentyl acrylate, and n-heptyl acrylate, respectively). In each simulation, six identical pentads were equilibrated.

TABLE 18

| A | | | B | | | C | | |
|---|---|---|---|---|---|---|---|---|
| MB Sequence | $CE_p$ (kJ/mol) | $CED_p$ ($10^5$ kJ/m$^3$) | MP Sequence | $CE_p$ (kJ/mol) | $CED_p$ ($10^5$ kJ/m$^3$) | MH Sequence | $CE_p$ (kJ/mol) | $CED_p$ ($10^5$ kJ/m$^3$) |
| BBBBB | 295.8 | 2.46 | PPPPP | 373.8 | 2.59 | HHHHH | 404.5 | 2.44 |
| MBBBB | 304.7 | 2.58 | MPPPP | 344.5 | 2.53 | MHHHH | 410.0 | 2.47 |
| BMBBB | 304.3 | 2.49 | PMPPP | 331.9 | 2.31 | HMHHH | 407.2 | 2.72 |
| BBMBB | 313.5 | 2.61 | PPMPP | 334.7 | 2.37 | HHMHH | 386.3 | 2.62 |
| MMBBB | 258.2 | 2.21 | MMPPP | 298.5 | 2.3 | MMHHH | 344.5 | 2.31 |
| MBMBB | 275 | 2.34 | MPMPP | 316.6 | 2.46 | MHMHH | 343.1 | 2.53 |
| MBBMB | 291.5 | 2.61 | MPPMP | 320.8 | 2.53 | MHHMH | 369.6 | 2.74 |
| MBBBM | 283.5 | 2.44 | MPPPM | 306.8 | 2.59 | MHHHM | 329.1 | 2.39 |
| BMBMB | 314.0 | 2.78 | PMPMP | 322.2 | 2.57 | HMHMH | 362.6 | 2.59 |
| BBMMB | 297.2 | 2.58 | PPMMP | 288.7 | 2.08 | HHMMH | 358.4 | 2.68 |
| BBMMM | 274.6 | 2.46 | PPMMM | 287.3 | 2.49 | HHMMM | 302.6 | 2.5 |
| BMBMM | 270.3 | 2.48 | PMPMM | 277.5 | 2.24 | HMHMM | 330.5 | 2.63 |
| BMMBM | 250.3 | 2.19 | PMMPM | 267.8 | 2.19 | HMMHM | 304.0 | 2.54 |
| BMMMB | 275.1 | 2.34 | PMMMP | 278.9 | 2.35 | HMMMH | 313.8 | 2.62 |
| MBMBM | 278.7 | 2.41 | MPMPM | 284.5 | 2.46 | MHMHM | 306.8 | 2.54 |
| MMBBM | 287.6 | 2.5 | MMPPM | 276.1 | 2.38 | MMHHM | 305.4 | 2.58 |
| BMMMM | 262.5 | 2.65 | PMMMM | 255.2 | 2.49 | HMMMM | 280.9 | 2.62 |
| MBMMM | 247.5 | 2.48 | MPMMM | 272.0 | 2.54 | MHMMM | 287.6 | 2.72 |
| MMBMM | 263.6 | 2.68 | MMPMM | 265.0 | 2.77 | MMHMM | 283.3 | 2.65 |
| MMMMM | 224.2 | 2.75 | MMMMM | 236.0 | 2.76 | MMMMM | 231.5 | 2.75 |

While FIG. 3A illustrates hetero-pentad interactions of p(MMA/nBA), Tables 15 and 16 summarize hetero-pentad interactions of p(MMA/nPA) and p(MMA/HA). As seen, similar trends are observed; alternating PMPMP/HMHMH distributions of monomers leads to higher CE.

Table 19 provides the cohesive energies ($CE_p$) and cohesive energy densities ($CED_p$) for a combination of: (a) MP and (b) MH combinations, (where: M—methyl methacrylate and P and H are n-pentyl acrylate and n-heptyl acrylate, respectively). In each simulation, three identical pentads 1 and 2 (six total) were equilibrated.

TABLE 19

| Pentad 1 | Pentad 2 | $CE_p$ (kJ/mol) | $CED_p$ ($10^5$ kJ/m$^3$) |
|---|---|---|---|
| a | | | |
| PMPMP | PMPMP | 322.20 | 2.57 |
| PMPMP | PMPPM | 322.77 | 2.49 |
| PMPMP | PMMPP | 321.44 | 2.63 |
| PMPMP | MMPPP | 300.19 | 2.39 |
| MMPPP | MMPPP | 298.50 | 2.30 |
| MMPPP | PMPPM | 309.62 | 2.34 |
| MMPPP | PMMPP | 302.64 | 2.35 |
| MMPPP | PPMPM | 320.77 | 2.42 |

TABLE 19-continued

| Pentad 1 | Pentad 2 | $CE_p$ (kJ/mol) | $CED_p$ ($10^5$ kJ/m³) |
|---|---|---|---|
| | | b | |
| HMHMH | HMHMH | 362.6 | 2.59 |
| HMHMH | HMHHM | 351.5 | 2.48 |
| HMHMH | HMMHH | 379.3 | 2.78 |
| HMHMH | MMHHH | 347.3 | 2.62 |
| MMHHH | MMHHH | 344.5 | 2.3 |
| MMHHH | HMHHM | 347.2 | 2.63 |
| MMHHH | HMMHH | 345.9 | 2.62 |
| MMHHH | HHMHM | 337.5 | 2.52 |

Enthalpy ($\Delta H_{eq}$), Entropy ($\Delta S_{eq}$), and Flexibility Parameter ($f_{eq}$)

In order to determine the entropic energy difference between equilibrated and fixed semi-helical states, we utilized the flexibility parameter of a polymer chain, $f_{eq}$, defined as a fraction of bonds capable of bending out of the collinear direction of previous segments, to calculate their Gibbs free energy difference $\Delta G$. Assuming that $\Delta H_d$=0 and the chain flexibility parameter is defined as $$f_{eq} = \frac{r_{max}}{r_o^2(l(2-f))};$$

where: $r_{max}$ is the fully extended chain length, $r_0$ is the end-to-end distance, and l is length of the repeat unit the $\Delta G_f$ values can be predicted 5 from $\Delta G = \Delta G_{hl} - \Delta G_{eq}$ where: $\Delta G_{hl}$ and $\Delta G_{eq}$ are the Gibbs free energies at the helical and equilibrated state respectively. Notably, $$\Delta G_i = -n_2 RT\left\{\ln(x) + \ln\left(\frac{z_i}{2e}\right) + (x-2)\ln\left(\frac{1}{(1-f)e}\right)\right\}$$

where: i is either hi (semi-helical) or eq (equilibrium), z is the lattice constant value between 6 and 12, $n_2$ is the number of moles and x is the number of repeat units per chain.[12] The molecular dynamic simulations allowed us to calculate flexibility parameter values at the both the semi-helical $f_{hl}$ and equilibrated $f_{eq}$ states using end-to-end distances of the modeled copolymers. Notably, based on previous assumptions that all fixed semi-helical chains have the same end-to-end distances, the f will remain constant throughout all compositions in the semi-helical state. At equilibrium, assuming that $\Delta H$ is 0, we can calculate conformational entropy ($S_{eq}$) using $\Delta G_{eq} = -T\Delta S_{eq}$. These values are shown in Table 1. Enthalpy of vaporization ($\Delta H_{eq}$) of p(MMA/nBA) copolymer chains, shown in Table 1, was extracted from molecular dynamic simulations of p(MMA/nBA) chains; its main contributor is the vdW interactions.

Self-Healing of Butyl Acrylate Substitutes

Figure 15:
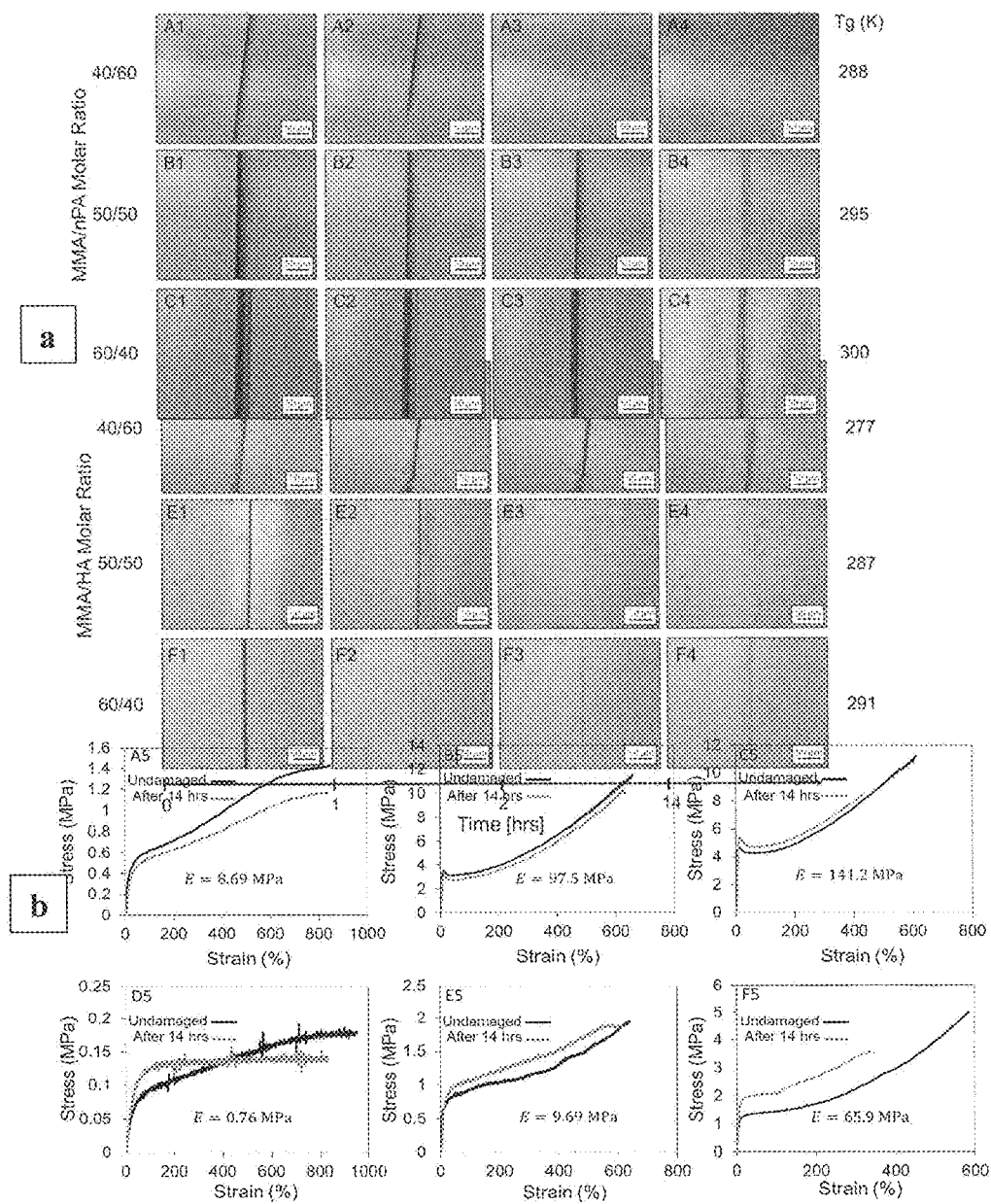
FIG. 15 part a contains optical images of damaged p(MMA/nPA) (A1-C1) and p(MMA/HA) (D1-C1) copolymers with the following MMA/Acrylate molar ratios: 40/60, 50/50, 60/40 which were allowed to repair under ambient conditions and in part b the corresponding stress-strain curves for each copolymer composition before damage and after 14 hrs.

Similar to the p(MMA/nBA) copolymers, p(MMA/nPA) and p(MMA/HA) copolymer films were damaged using a micro cutter at room temperature and allowed to heal for 14 hrs. As seen in FIG. 15-1, p(MMA/nPA) and p(MMA/HA) self-repair under ambient conditions within 40/60-50/50 MMA/Acrylate (Acrylate: PA or HA) compositional range, as the materials are able to recover 90-100% of $\varepsilon_{max}$ and 80-100% of $\sigma_{break}$ of their original properties (FIG. 15-2). Tables 6 and 7 summarized these values.

Self-Healing Efficiency

To demonstrate self-healing efficiency, a ~200 μm thick 46/54 p(MMA/nBA) film was severed, physically reattached within ~1 min, and allowed to self-heal for ~80 hrs under ambient conditions. FIG. 17 illustrates the results of stress-strain analysis of undamaged (FIG. 17, Curve A) and self-healed (FIG. 17, Curve B) films. Undamaged copolymers exhibit stress at break ($\sigma_{break}$) 9.74 MPa at ~620% maximum elongation ($\varepsilon_{max}$). The same films after being severed and allowed to self-heal show $\sigma_{break}$=6.79 and $\varepsilon_{max}$=520%, indicating 70-85% recovery of the original properties. Their toughness is demonstrated by an attempt to break them by stretching. For comparison, Table 20 provides a comparison of mechanical properties of selected copolymer films outside the self-healable region (Regions I and III of FIG. 2A) and clearly indicates that roughly 5-30% recovery is observed. Notably, physical separation time after films were severed under ambient conditions may impact self-healing properties: when the films are severed and separated under 3 hrs and reattached, they still self-heal, but mechanical properties are diminished which is likely attributed to relaxation times which are typically 2-3 hrs for thermoplastics and shorter for thermosets. Also, even small imperfections in reattaching severed films have significant impact on time and recovery of physical properties.

Table 20 illustrates the Mechanical properties of undamaged and self-healed p(MMA/nBA) copolymers with selected MMA/nBA feed (f) and actual (F) molar ratios: maximum elongation at break ($\varepsilon_{max}$), stress at break ($\sigma_{break}$), and % recovery of $\varepsilon_{max}$ ($R_\varepsilon$) and $\sigma_{break}$ ($R_\sigma$) after 80 hrs of self-healing under ambient conditions. The $\varepsilon_{max}$ and $\sigma_{break}$ represent an average of four measurements.

TABLE 20

| MMA/nBA Molar Feed Ratio (f) | MMA/nBA Actual Ratio (F)* | $\varepsilon_{max}$ (%) | | $\sigma_{break}$ (MPa) | | $R_\varepsilon$ (%) | $R_\sigma$ (%) |
|---|---|---|---|---|---|---|---|
| | | undamaged | self-healed | undamaged | self-healed | | |
| 40/60** | 43/57 | 1150 ± 153 | 55 ± 63 | 0.68 ± 0.13 | 0.21 ± 0.17 | 4.8 | 30.1 |
| 45/55 | 46/54 | 620 ± 62 | 520 ± 77 | 9.74 ± 0.72 | 6.79 ± 0.78 | 83.8 | 71.5 |
| 55/45*** | 57/43 | 153 ± 90 | — | 13.79 ± 0.63 | — | — | — |

*determined by $^1$H NMR.
**Due to inability to completely self-heal standard deviations are high.
***unable to self-heal.

The invention has been described with reference to the preferred embodiments without limit thereto. One of skill in the art would realize additional embodiments and improvements which are within the scope of the invention as set forth in the claims appended hereto.

The following References are incorporated herein by reference.

S. R. White et al., *Nature* 409, 794-797 (2001).
X. Chen et al., *Science* 295, 1698-1702 (2002).
B. Ghosh, M. W. Urban, *Science* 323, 1458-1460 (2009).
K. Imato et al., *Angewandte Chemie International Edition* 51, 1138-1142 (2012).
H. Ying, Y. Zhang, J. Cheng, *Nat Commun* 5, (2014).
P. Cordier, F. Tournilhac, C. Soulié-Ziakovic, L. Leibler, *Nature* 451, 977-980 (2008).
M. Burnworth et al., *Nature* 472, 334-337 (2011).
N. Holten-Andersen et al., Proceedings of the National Academy of Sciences 108, 2651-2655 (2011).
M. Nakahata, Y. Takashima, H. Yamaguchi, A. Harada, *Nature communications* 2, 511 (2011).
Y. Chen, A. M. Kushner, G. A. Williams, Z. Guan, *Nature chemistry* 4, 467-472 (2012).
C.-H. Li et al., *Nat Chem* 8, 618-624 (2016).
Y. Yang, M. W. Urban, *Angewandte Chemie International Edition* 53, 12142-12147 (2014).
C. C. Corten, M. W. Urban, *Advanced Materials* 21, 5011-5015 (2009).
L. Huang et al., *Advanced Materials* 25, 2224-2228 (2013).
H. M. Jonkers, A. Thijssen, G. Muyzer, O. Copuroglu, E. Schlangen, *Ecological engineering* 36, 230-235 (2010).
Y. Yang, X. Ding, M. W. Urban, *Progress in Polymer Science* 49, 34-59 (2015).
F. S. Bates et al., *Science* 336, 434-440 (2012).
Y. Yang, M. W. Urban, *Chemical Society Reviews* 42, 7446-7467 (2013).
D. Y. Wu, S. Meure, D. Solomon, *Progress in Polymer Science* 33, 479-522 (2008).
M. W. Urban, Stimuli-responsive Materials: From Molecules to Nature Mimicking Materials Design. (Royal Society of Chemistry, 2016), pp. 348.
B. Sandmann et al., Macromolecular rapid communications 36, 604-609 (2015).
M. W. Urban, Attenuated total reflectance spectroscopy of polymers: theory and practice. (American Chemical Society, 1996), pp. 146-7.
M. W. Urban, Vibrational spectroscopy of molecules and macromolecules on surfaces. (John Wiley, New York, 1993), pp. 261-262.
F. Bovey, *High resolution NMR of macromolecules*. (Elsevier, 2012), pp. 256-258.
H. N. Cheng, T. Asakura, A. D. English, *NMR spectroscopy of polymers: innovative strategies for complex macromolecules*. (ACS Publications, 2011), pp. 247-249.
C. C. Hornat, Y. Yang, M. W. Urban, *Advanced Materials* 29, (2017).
K. Autumn et al., Proceedings of the National Academy of Sciences 99, 12252-12256 (2002).
K. Dalnoki-Veress, J. Forrest, C. Murray, C. Gigault, J. Dutcher, *Physical Review* E 63, 031801 (2001).
R. D. Priestley, C. J. Ellison, L. J. Broadbelt, J. M. Torkelson, *Science* 309, 456-459 (2005).
G. Adam, J. H. Gibbs, *The journal of chemical physics* 43, 139-146 (1965).
P.-J. Flory, in Proceedings of the Royal Society of London A: Mathematical, Physical and Engineering Sciences. (The Royal Society, 1956), vol. 234, pp. 60-73.
J. De Boer, Transactions of the Faraday Society 32, 10-37 (1936).
C. C. Hornat, Y. Yang, M. W. Urban, *Advanced Materials* 29, (2017).
P. J. Flory, *Principles of polymer chemistry*. (Cornell University Press, 1953), pp. 156.
J.-D. Tong, R. Jerôme, *Macromolecules* 33, 1479-1481 (2000).
J. A. Woollam et al., in Optical Metrology: A Critical Review. (International Society for Optics and Photonics, 1999), vol. 10294, pp. 1029402.
H. Tompkins, E. A. Irene, *Handbook of ellipsometry*. (William Andrew, 2005), pp. 158-160.
J. C. Seferis, *The Wiley Database of Polymer Properties*, (2003).
A. Cunningham, I. Ward, H. Willis, V. Zichy, *Polymer* 15, 749-756 (1974). G. Bayer, W. Hoffmann, H. Siesler, *Polymer* 21, 235-238 (1980).
H. S. Shin et al., *Langmuir* 18, 5953-5958 (2002).
G. R. Quinting, R. Cai, *Macromolecules* 27, 6301-6306 (1994).
J. Rodríguez-Cabello, J. Merino, L. Quintanilla, J. Pastor, *Journal of applied polymer science* 62, 1953-1964 (1996).
F. Bovey, *High resolution NMR of macromolecules*. (Elsevier, 2012), pp. 145-160.
S. Saïdi, F. Guittard, C. Guimon, S. Geribaldi, *Macromolecular Chemistry and Physics* 206, 1098-1105 (2005).
J. Bevington, D. Harris, *Journal of Polymer Science Part C: Polymer Letters* 5, 799-802 (1967).
M. J. Ziegler, K. Matyjaszewski, *Macromolecules* 34, 415-424 (2001).
S. G. Roos, A. H. Müller, K. Matyjaszewski, *Macromolecules* 32, 8331-8335 (1999).
A. White, F. E. Filisko, *Journal of Polymer Science Part C: Polymer Letters* 20, 525-529 (1982).
J. Barth, M. Buback, P. Hesse, T. Sergeeva, *Macromolecules* 43, 4023-4031 (2010).
J. Sohma, T. Komatsu, H. Kashiwabara, *Journal of Polymer Science Part C: Polymer Letters* 3, 287-293 (1965).
M. Buback, M. Egorov, T. Junkers, E. Panchenko, *Macromolecular Chemistry and Physics* 206, 333-341 (2005).
J. Barth, M. Buback, P. Hesse, T. Sergeeva, *Macromolecular rapid communications* 30, 1969-1974 (2009).
G. Bristow, W. Watson, *Transactions of the Faraday Society* 54, 1731-1741 (1958).
P.-J. Flory, in *Proceedings of the Royal Society of London A: Mathematical, Physical and Engineering Sciences*. (The Royal Society, 1956), vol. 234, pp. 60-73.
P.-G. De Gennes, P.-G. Gennes, *Scaling concepts in polymer physics*. (Cornell university press, 1979), pp. 78-80.
J. G. Curro, P. Pincus, *Macromolecules* 16, 559-562 (1983).
H. H. Le, T. Lüpke, T. Pham, H.-J. Radusch, *Polymer* 44, 4589-4597 (2003).
S. A. Baeurle, A. Hotta, A. A. Gusev, *Polymer* 46, 4344-4354 (2005).
L. Imbernon, S. Norvez, L. Leibler, *Macromolecules* 49, 2172-2178 (2016).

The invention claimed is:
1. A copolymer comprising:
first units comprising first pendant groups wherein said first pendant groups are alkyls having at least 1 to no more than 6 carbons;
second units comprising second pendant groups wherein said second pendant groups are alkyls having at least 2 to no more than 8 carbons;
wherein said first units and said second units are in a molar ratio of 45/55 to 55/45 and said pendant groups form an inter-pendant space having a volume of at least 80 Ang.$^3$ to no more than 140 Ang.$^3$; and
wherein said copolymer is a random compolymer comprising no more than 3 adjacent first units and no more than 3 adjacent second units.

2. The copolymer of claim 1 wherein said inter-pendant space has a volume of at least 110 Ang.$^3$ to no more than 130 Ang.$^3$.

3. The copolymer of claim 1 wherein said first unit is polymerized alkyl methacrylate.

4. The copolymer of claim 3 wherein said first unit is polymerized alkyl methacrylate comprising 1-3 carbons.

5. The copolymer of claim 4 wherein said first unit is polymerized methyl methacrylate.

6. The copolymer of claim 1 wherein said second unit is polymerized alkyl acrylate.

7. The copolymer of claim 6 wherein said second unit is comprises 4-6 alkyl carbons.

8. The copolymer of claim 7 wherein said second unit is polymerized butyl acrylate.

9. The copolymer of claim 1 wherein said copolymer comprises no more than 2 adjacent first units and no more than 2 adjacent second units.

10. The copolymer of claim 1 wherein said copolymer comprises alternating first units and second units.

11. The copolymer of claim 1 wherein said copolymer has a molecular weight of 10-10,000 kDA.

12. The copolymer of claim 11 wherein said copolymer has a molecular weight of 30-5,000 kDA.

* * * * *